United States Patent [19]

Randol

[11] 3,727,405
[45] Apr. 17, 1973

[54] VACUUM-POWER BRAKE BOOSTER

[76] Inventor: Glenn T. Randol, Mountain Lake Park, P. O. Box 275, Loch Lynn Heights, Md. 21550

[22] Filed: Oct. 13, 1970

[21] Appl. No.: 80,267

[52] U.S. Cl. ..............................60/54.5 P, 91/369 B
[51] Int. Cl. ..............................................F15b 7/00
[58] Field of Search ....................91/369 B; 60/54.6 P

[56] References Cited

UNITED STATES PATENTS

| | | | |
|---|---|---|---|
| 3,072,106 | 1/1963 | Randol | 91/369 B |
| 3,175,235 | 3/1965 | Randol | 91/369 B |
| 2,800,770 | 7/1957 | Edge et al. | 91/369 B |
| 2,790,306 | 4/1957 | Ingres | 91/369 B |
| 3,016,881 | 1/1962 | Wilkens et al. | 91/369 B |

Primary Examiner—Martin P. Schwadron
Assistant Examiner—A. M. Zupcic

[57] ABSTRACT

A vacuum-power booster incorporating a master brake cylinder for producing the major portion of the actuating force for the latter under an improved manual follow-up control valve of the poppet-type operably related with a multi-lever force and reaction-transmitting mechanism normally ineffective to transmit reaction from master cylinder pressures during manual slack take-up operation and including selective fulcrum blocks carried by the booster output element and replaceable at will to "custom-fit" pedal pressure to the sensitivity the driver desires; a provision for spring resistance to initial pedal depression supplemented by said reaction mechanism, to produce a two-stage transferral of reaction to the brake-pedal for predictable braking control; a provision for detachably connecting three cup-shaped members (metallic shells) to produce the booster power-cylinder and to anchor the outer margin of the diaphragm portion of the power-member airtight therein; a provision for a sleeve-like flexible member adapted to slidably support and seal that portion of said control valve projecting to the exterior of said power-cylinder; and a safety provision bypassing said control valve enabling driver-operation of the master cylinder as a safeguard against any power inadequacy or malfunction otherwise.

29 Claims, 16 Drawing Figures

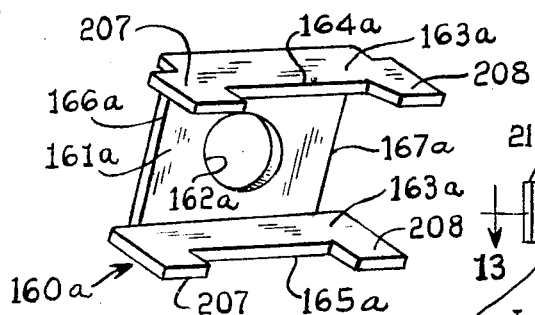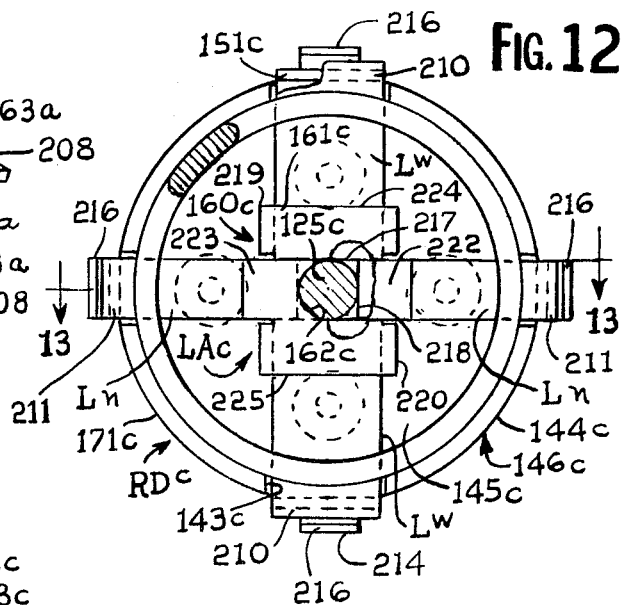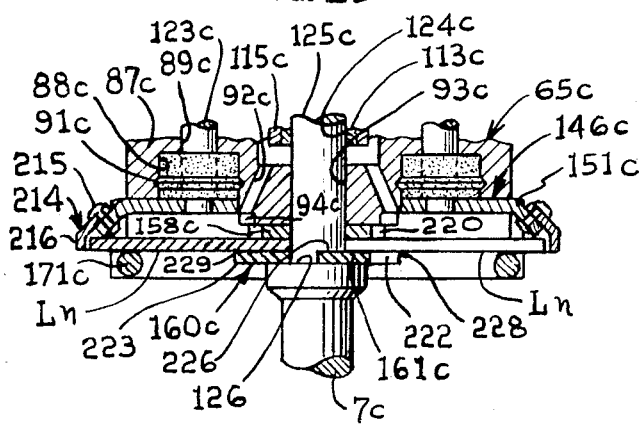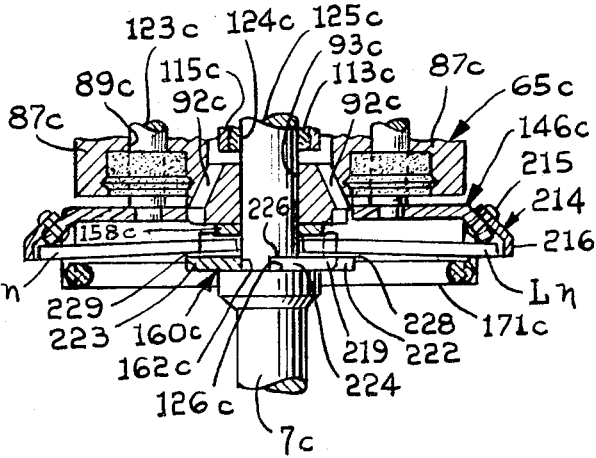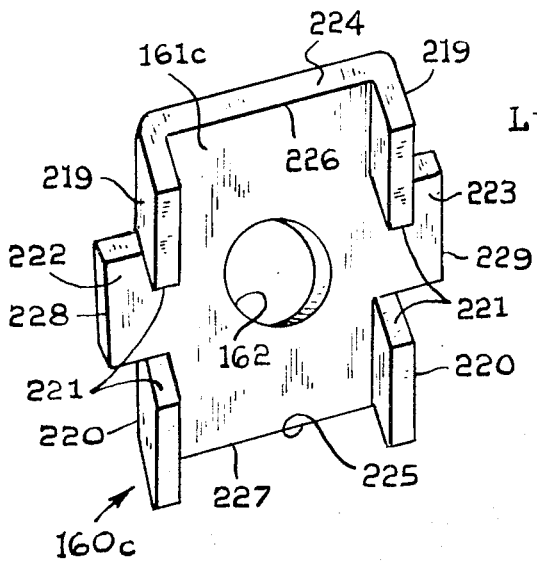

VACUUM-POWER BRAKE BOOSTER

This invention relates generally to booster brake mechanisms corporating a pressure differential operated servomotor (servo or device) of the vacuum-suspended type for assisting in the actuation of the master brake cylinder in known forms of hydraulic brake systems on motor vehicles and the like. The invention constitutes improvements on booster-type servomotors of the general character disclosed in U.S. Pats. Nos. 3,072,106; 3,101,032 and 3,175,235 granted to me Jan. 8 and Aug. 20, 1963, and March 30, 1965, respectively, such improvements relating in a broader patent sense to a novel and improved follow-up control valve of the poppet-type and having replaceable valve faces and seats; simplified means for producing the servo power-cylinder and connecting the outer marginal portion of a preferably flexible power-member (diaphragm) airtight therein; a force transmitting and reaction lever mechanism including removable fulcrum means for changing the proportion of work between the operator and the servomotor, to "custom-fit" pedal pressure to driver's choice at will; a reactive and return spring continuously opposing pedal movement and cooperating with said reaction mechanism operative to transmit reaction, to produce a two-stage transferral of reaction to the pedal for predictable braking control; and means enabling driver force to bypass said control valve when actuating the master brake cylinder in the event of power failure or power-run-out.

The primary objective of the invention is to produce an improved predictable booster operation over that first disclosed in my U.S. Pat. Nos. 3,072,106 and 3,175,235 wherein the operator (vehicle driver) benefits from predictable control over the braking force (pressure) at any given position of the brake-pedal through physical contact with the latter to closely simulate pedal-feel reacting from an operator-operated master cylinder, without sacrificing the highly desirable operating characteristic of reduced pedal effort in applying the vehicle brakes. Therefore, a related object is to provide a booster brake operation which under a predetermined combination of installed spring reactions plus the normal ineffective condition of the force and reaction mechanism aforesaid to transmit reaction, inhibit the operator from inadvertently over-braking which can result in erratic control of the vehicle with possible discomfort and/or injury to the occupants. In a broader patent sense, such predictable control resulting from said inhibited booster operation, is a function of initial manual actuation of the control valve against said spring combination toward applied position short of fully reaching such position and of simultaneously moving the servo work-performing element (push-rod) and said force and reaction mechanism ineffective to transmit reaction, to develop a work-load (resistance) of such magnitude reacting on said work element to substantially arrest movement of the latter, and thereby conditioning the control valve for actuation to applied position and said force and reaction mechanism to effective reaction transmitting position under additional manual force exerted on said control valve acting on said work element through the intermediary of said force and reaction mechanism moving into reaction transmitting position. Stated differently, the novel control valve disclosed herein requires a resistance acting counter to initial manual actuation thereof to enable subsequent manual actuation to applied position under additional manual force effective to actuate the force and reaction mechanism aforesaid to a position effective to transmit reaction from the servo work-element (master cylinder) to the control valve therefore to the brake-pedal under manual actuation upon activating said booster servo, and wherein the power-diaphragm assembly in said booster servo initially moves with said control valve in unapplied position and said force and reaction mechanism in non-reaction transmitting position as a unit until said servo work element encounters sufficient resistance to substantially arrests such unitary movement.

Under a different combination of installed spring reactions, initial manual actuation is effective to actuate said control valve in unapplied position as a unit relatively to said power-diaphragm assembly releasably stabilized in normal position and to condition said force and reaction mechanism to transmit reaction as aforesaid upon said servo work element encountering said resistance to movement thereof; whereupon, application of additional manual force to actuate said control valve to applied position causes said power-diaphragm assembly to become operatively energized but with less predictable control thereover, therefore, insofar as operator reaction is concerned, braking control is more sensitive.

A more specific object relating to the aforesaid novel control valve, is the provision of an outer tubular member slidably supported on the booster power-cylinder and a inner tubular member arranged in concentric telescopic relationship and slidably supported on a portion of the servo work element adapted to actuate a hydraulic master cylinder and included piston means, and including a pair of normally compressed springs reacting on the outer valve member and between said two valve members, respectively, to return both valve members to their respective normal released positions wherein said control valve is disposed in unapplied position, said control valve being enclosed in a chambered cage coaxially formed in the movable power-diaphragm assembly and characterized by a "vacuum-valve" and an "air-valve" having replaceable valve seats and faces for economical servicing.

A more specific object relating to the production of the aforesaid booster power-cylinder, is the provision of a pair of cylindrically walled cup-shaped member (shells) and a cylindrically flanged cup-shaped auxiliary member (stamping) contiguously disposed with respect to the bottom wall of one of said pair of shells, and a cup-shaped power-member having a peripheral flange normal to the bottom wall thereof for supporting the inner segment (leg) of a looped-configuration defining the peripheral margin of said flexible power-diaphragm, said latter flange being radially spaced from and normally in circular alignment with said flange on said auxiliary shell, for reception of the outer segment (leg) of said diaphragm loop. A plurality of circumferentially spaced interengageable arcuate segments having terminal outstanding flanges, respectively, defines the open ends of the cylindrical walls of said pair of shells, said flanged segments being disposed in alternately spaced interengaging relation around said cylindrical walls to produce an annular channel therebetween for reception of a metallic clamping member (ring) in engagement with said segments and their respective flanges to rigidly interlock said pair of shells in a unitary assembly and simultaneously anchor the outer diaphragm segment airtight between said interengaging segments and the flange on said auxiliary shell.

A more specific object relating to the aforesaid combined bearing and sealing means (flexible member), is the provision of a novel cylindrical roll-type sleeve (boot) preferably formed of molded rubber or a rubber-coated fabric to induce rolling-action at one end. A pair of elongated radially spaced inner and outer walls terminates in a pair of annular beads, respectively, with the outer bead in engagement with a complementally formed annular channel encircling the opening in the rear end wall of the power-cylinder through which the portion aforesaid of the control valve mechanism operably projects to the exterior, and the inner bead is carried in a complementally formed annular channel in the outer valve member whereby sliding movement of the latter is accommodated and supported on that portion of the inner wall engaging said opening in the rear end wall of said servo power-cylinder and, at the same time, sealing said opening against leakage.

A more specific object relating to the aforesaid novel force and reaction-level transmitting mechanism, is the provision of two pairs of radially disposed levers with their inner ends characterized by arcuate cutouts, respectively, to straddle-mount substantially half of the diameter of a reduced cylindrical extension of the booster work element, to control in part radial stabilization of said levers. A cup-shaped movable reaction member operably interconnects the outer end portions of said levers with the outer valve member, and the inner end portions of one pair of levers are offset from the corresponding portions of the other pair of levers to enable straddle-mounting which produces space therebetween occupied by a thrust plate. A central thrust portion carried by said movable power-diaphragm assembly is adapted to act on the opposite side of the inner end portions of the other pair of levers. A U-shaped pressure-distributing member (fulcrum block) is removably seated against an abutment on said booster work element and having a pair of parallelly spaced flanges formed with beveled rear edges to produce pressure lines engageable by intermediate points on the other pair of levers, and the corresponding points on the one pair of levers being engageable by the ends (inner corners) of the fulcrum block proper thus arranging said four levers 90° apart for balanced transmission of force via said reaction member to said outer valve member, said levers being normally perpendicular to the axis of said booster work element extension with their inner end surface portions contiguous to confronting surface portions on said thrust plate, thrust portion and fulcrum block proper, to render said levers ineffective to transmit reaction by reason of their inability to rock, said levers being movable at their outer ends under said reaction member acted on by said outer valve member, to tilted position with respect to the axis of said booster work element extension for reaction transmission during actuation of said control valve to applied position.

An object related to the object next above, is to produce a modified fulcrum block by adding lateral extensions to the flanges, respectively, in spaced relation for reception of the inner end portions of the other pair of levers to radially stabilize the same in part thus eliminating straddle-mounting thereof in favor of the inner ends riding the outer diameter of said work element extension, and wherein the beveled edges on the flanges are replaced by edges parallel to the fulcrum block proper to serve as pressure lines for the intermediate points on said other pair of levers. This modified fulcrum block, therefore, enables the flanges to radially stabilize the inner end portions of all four levers.

Another modified form of said reaction-levers provides for the elimination of the offset in the one pair of levers and the thrust plate therebetween whereby the inner end portions of all four levers are in the same circular plane with their respective outer end portions, and a complementally modified pressure-distributing member (fulcrum block) is adapted to cooperate with the circularly aligned inner end portions of said levers by utilizing a pair of horizontal flanges in spaced relation for radially stabilizing the other pair of levers. Medially disposed slots are provided in said flanges, respectively, for radially stabilizing the inner end portions of said one pair of levers, and wherein said last-defined fulcrum block is a sheet metal stamping enabling a portion of the metal strip extruded in processing said slots to produce a pair of laterally extending projections (tabs) disposed in the same plane with the fulcrum block proper to serve as fulcrums for the intermediate portions of said one pair of levers, and the top and bottom edges of said fulcrum block proper serving as fulcrums for the intermediate portions of the other pair of levers.

A further and important object related to the two objects immediately preceding, is the novel utilization of the two interchangeable fulcrum blocks which removably seat on the extension of the booster work element, to provide optionally dimensioned blocks readily substituted at will to establish the desired fulcrum points for the levers which correspondingly change the division of work between the driver and the booster servo and thereby "custom-fitting" the pedal pressure to the sensitivity that the car driver desires. Accordingly, this novel design copes, in a simple mechanical manner with the problem of oversensitivity connected with power braking. Often, in order to provide a more satisfactory control in conventional power-brake arrangements, the pedal pad is lowered close to the floor board to approximately the same plane, when released, as the accelerator pedal. This sacrifices mechanical advantage between the pedal and master brake cylinder, which could be important in the event of either a power-run-out or failure. Manual changing of the effective ratio within the force and reaction mechanism, on the other hand, permits the work for brake operation to be divided between the driver and the booster servo such as, for example, to provided "light," "medium" or "heavy" brake pressure. In addition, such adjustments in the force and reaction mechanism enable selection of a booster operation compatible with the type of braking system employed on a particular line and/or class of motor vehicles.

Another object related to the three objects immediately preceding, is the provision of optional types and sizes of distributing members (fulcrum blocks) aforesaid enabling the inner ends of said reaction levers to either straddle-mount said portion of said servo work element (push-rod) or ride the outer diameter thereof, that is, the inner ends of said reaction levers may rock on pressure lines carried by said movable power-diaphragm assembly, in the same plane with the axis of said push-rod portion or radially spaced therefrom.

A further more specific object relating to the aforesaid bypassing means, is the provision of coaxial actuation of the operator-operated element (push-rod) and booster servo work element (push-rod) through an interposed element normally effective to transmit actuating force to the control valve, to enable operator actuation of the master brake cylinder to bypass the control valve in the event of booster power-run-out or failure for braking safety enabling the driver to control the vehicle under all operating conditions with or without booster assist.

A more specific object relating to the aforesaid reactive and return spring, is its novel adaptation to provide immediate resistance to pedal depression and also to serve as a supplemental reactive force to that provided proportionally by the four reaction levers whereby a two-stage transferral of reaction to the pedal is produced for driver awareness of the degree of brake pressure in effect as the pedal is being depressed. Accordingly, sensitivity is dampened by this reactive spring providing instant opposition to initial pedal movement, while the reaction levers impress a proportional supplemental reactive force from the master cylinder against the pedal upon operative energization of the booster servo. Another novel operating feature of this reactive spring resides in its continuous opposition to pedal movement, and during pedal depression such spring reaction is negated against the servo power-member for full power-thrust of the latter, while during pedal release to take the vehicle brakes "off," such spring reaction is effective to assist in restoring said servo power-member to normal "power-off" position and the control valve to corresponding unapplied position.

And, a still further object of the invention is to provide novel cooperative modified relationships of the two springs operably disposed in the booster power-cylinder, wherein one of said springs is adapted to continuously react on the movable power-diaphragm assembly, and the other spring continuously reacts on the outer valve member via a reaction member operably related with said force and reaction mechanism, whereby both springs jointly effect return of said power-diaphragm assembly to "power-off" position with the control valve in unapplied position while operator force exerted on the outer valve member in opposition to said other spring, is effective to move the control valve to applied position and said reaction member as a unit to disengage the latter from said power-diaphragm assembly moving in a brake-assisting direction to provide the operator with immediate reaction from the other spring without opposing movement of said power-diaphragm assembly even in advance of actuating the control valve to applied position to create a pressure differential on said power-diaphragm assembly, thus providing a more predictable control over the braking force required. Another modified relationship is produced by eliminating the said one spring so that return of the power-diaphragm assembly is effected in part by the other spring reacting via said reaction member on said power-diaphragm assembly moving toward normal released position with the control valve in unapplied position. Still, another modified relationship results from the interposition of a valve return spring between a portion of said power-diaphragm assembly and the outer valve member to retract the latter toward normal position in cooperation with the other spring aforesaid. A still further modified relationship is created by installing the valve return spring under such tension as to overcome said one spring before yielding to thus move the power-diaphragm assembly as a unit with said control valve in unapplied position to take up the slack in the brake system; whereupon, resistance thus produced is effective to enable additional operator force to actuate the control valve to applied position to produce power-assist smoothly merging with operator follow-up control of the vehicle brakes.

Further advantages reside in the brake booster under consideration, such as its simplicity, low-cost, long service life with no special training required for smoothly controlling the vehicle brakes since predictable braking control is a built-in feature.

The invention consists of the novel constructions, arrangements and devices hereinafter described and claimed for achieving the above-stated objectives and such other objects and advantages as will appear in the course of the following comprehensive disclosure of preferred embodiments illustrated by the accompanying drawing, in which:

Figure 2:
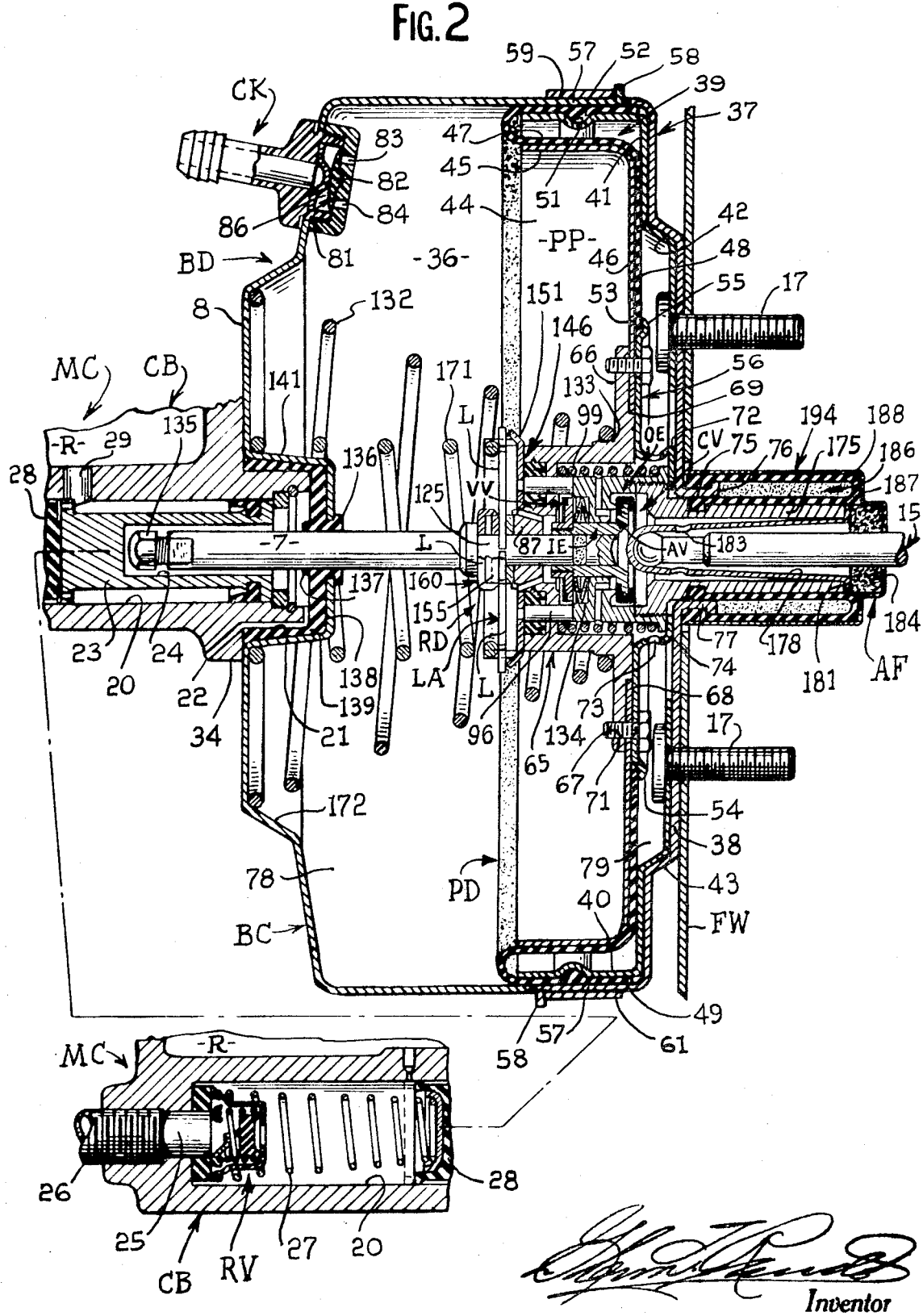
FIG. 2 is a longitudinal-vertical sectional view of the booster device per se shown in FIG. 1 on an enlarged scale to clarify structural details.
Figure 3:
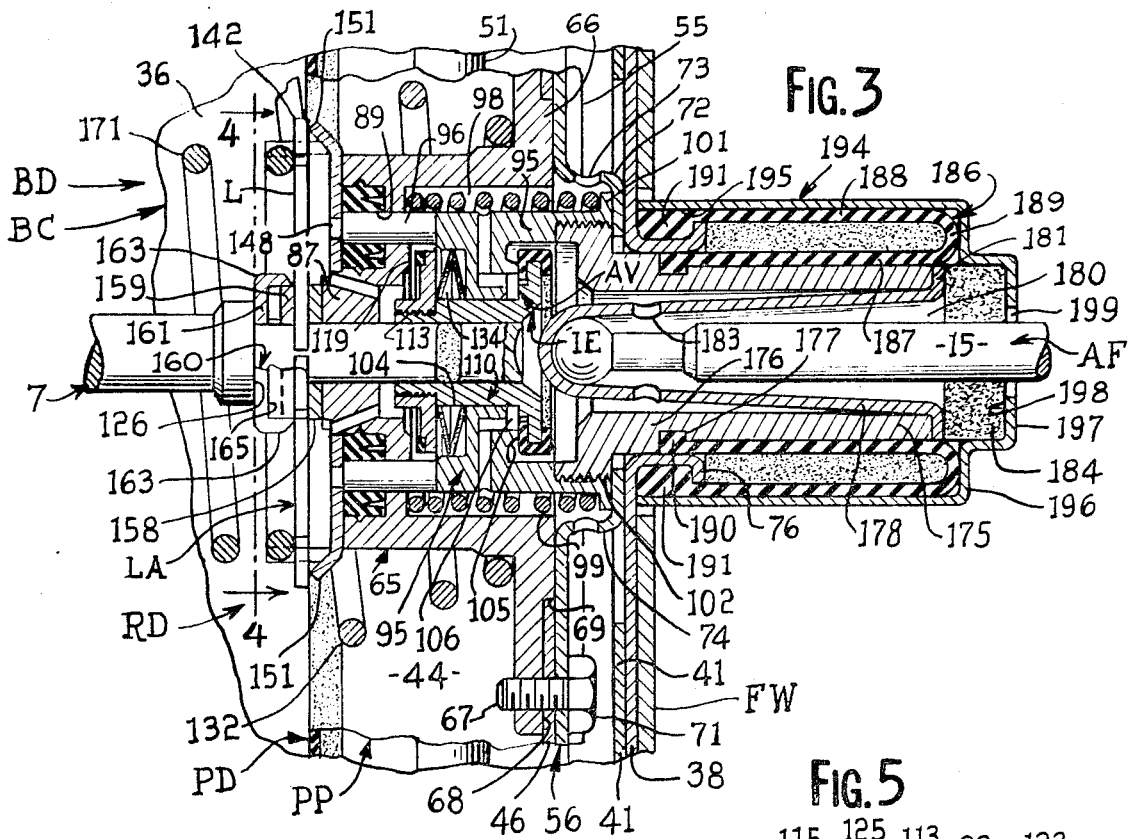
FIG. 3 is a fragmentary view of FIG. 2 on an enlarged scale showing structural details of the central portion of the booster device which includes the novel poppet-type control valve and associated portions of the movable power-diaphragm assembly.
Figure 5:
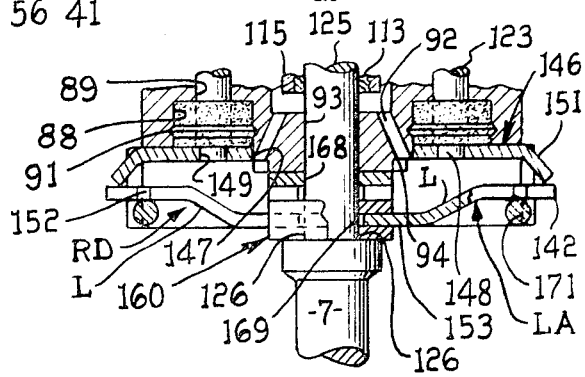
Figure 4:
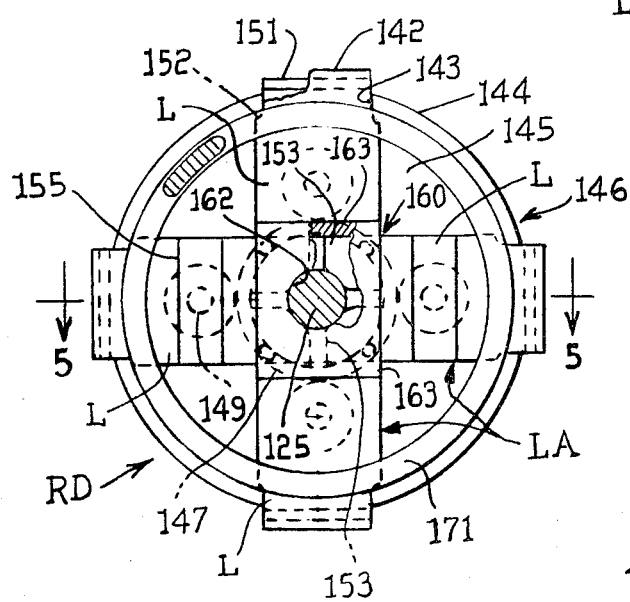
FIG. 4 is a transverse view partly in section taken along the line 4—4 of FIG. 3 and showing structural details of the novel four-lever reaction-transmitting mechanism and operably related reaction and return spring.
Figure 10:
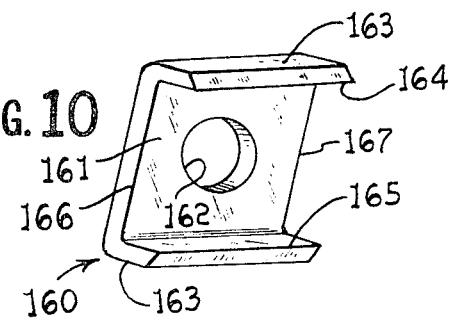
Figure 6:
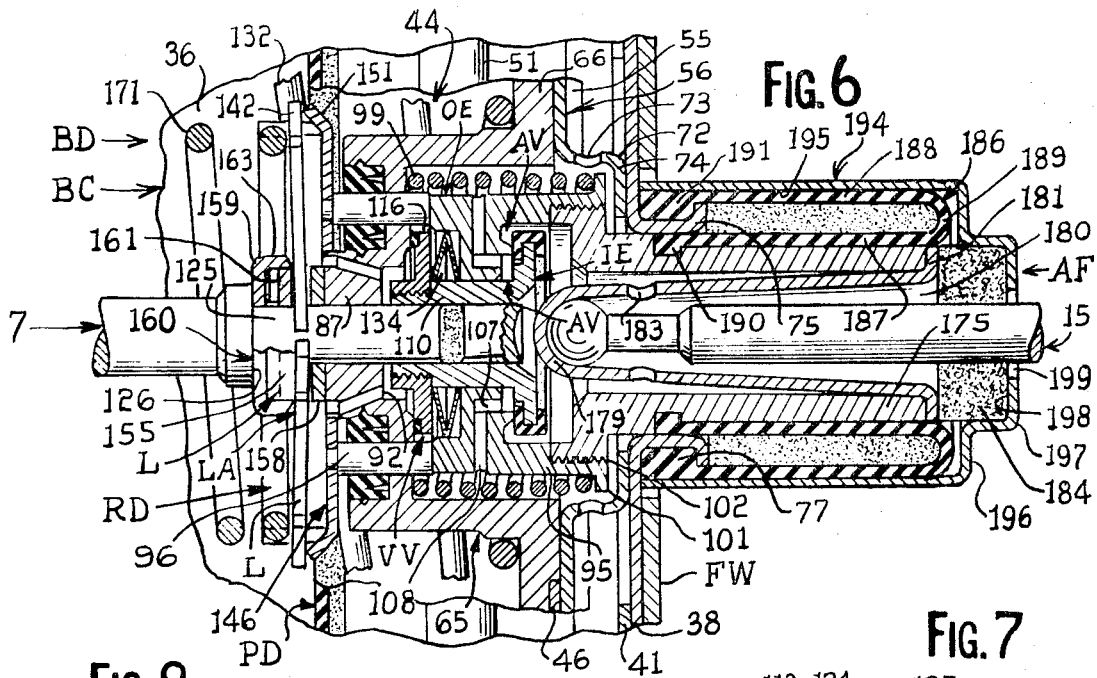
Figure 8:
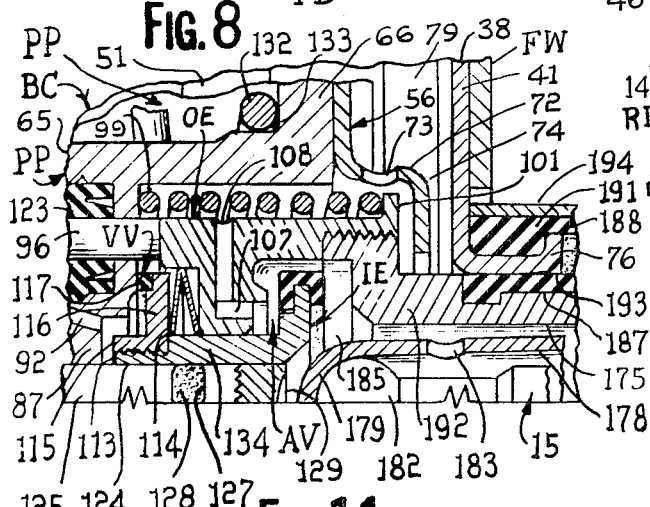
Figure 7:
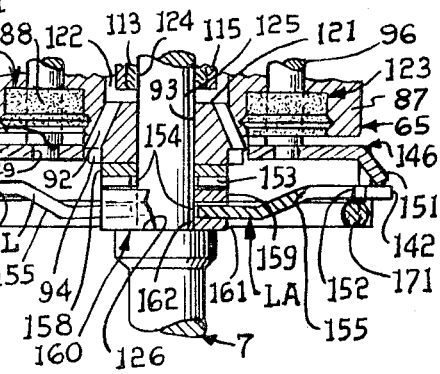
Figure 11:
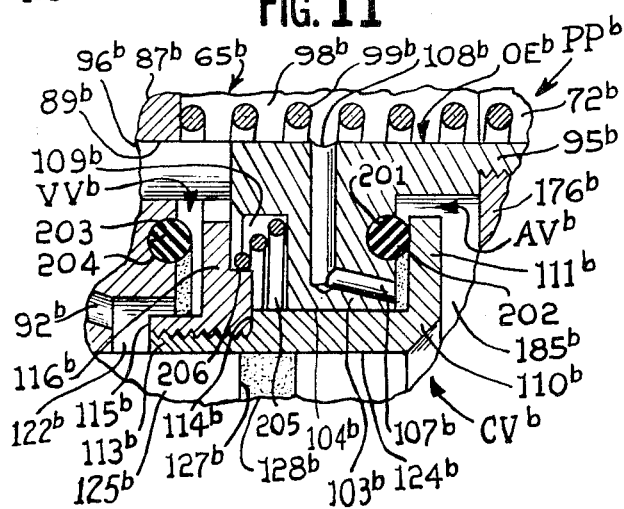
Figure 9:
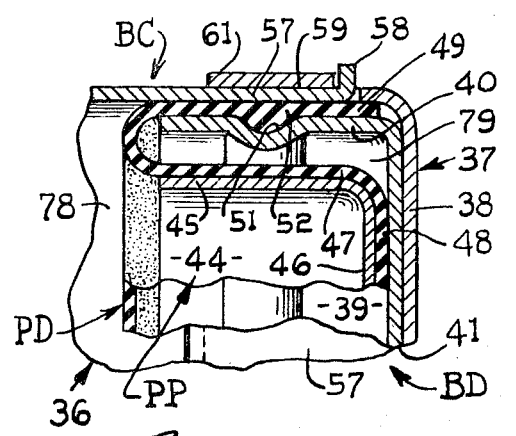

FIG. 5 is a horizontal section taken along the line 5—5 of FIG. 4 and showing structural details of the operably related reaction levers, booster work-performing element slidably supported on a coaxial ported portion of the power-diaphragm assembly and associated annular lip-type seals carried thereby through which the mechanical connections project to interconnect the reaction member with said outer valve member;

FIG. 6 is a view similar to FIG. 3 but showing the control valve operated to initiate applied position and the operably related reaction-lever mechanism in tilted operating position effective to transmit braking reaction to the operator via the outer valve member upon the latter moving to place the control valve in applied position;

FIG. 7 is a view similar to FIG. 5 but showing the relative operated positions of the parts corresponding to FIG. 6;

FIG. 8 is a fragmentary view of FIG. 6 on an enlarged scale showing the control valve operated to applied position thus placing the booster power-diaphragm assembly under a pressure differential to produce power-assist;

FIG. 9 is a fragmentary section taken from FIG. 2 on an enlarged scale to clarify structural details of the means for interlocking the pair of cup-shaped shells to produce the booster power-cylinder, and for anchoring the peripheral margin of the flexible power-diaphragm between an auxiliary cup-shaped shell and the interlocking portions of said pair of shells to produce an airtight assembly thereof;

FIG. 10 is an isometric view of the removable pressure-distributing member (fulcrum block) per se in the force and reaction-transmitting mechanism for varying the division of work between the driver and booster servo by substituting optional sizes thereof;

FIG. 10A is a modified from of the fulcrum block shown in FIG. 10, to provide the flanged portions with spaced lateral extensions for controlling the inner end portions of one pair of reaction-levers, said portions terminating in end faces normal to said levers when ineffective to transmit reaction, and wherein the pressure lines engageable with the intermediate portions of said levers, respectively, are defined by the outer edges of said end faces;

FIG. 11 is an enlargement of a portion of the control valve device shown in FIG. 3, which embodies a pair of modified valve seats and a conical wire spring in lieu of the pair of Belleville spring washers, reacting between the inner and outer valve members provided with valve faces to cooperate with the aforesaid modified valve seats, respectively, to produce the aforesaid "vacuum-valve" and "air-valve," respectively;

FIG. 12 is a transverse sectional view similar to FIG. 4 of the main embodiment, showing a modified reaction-lever arrangement and operably related pressure-distributing member (fulcrum block) wherein the offset construction of one pair of levers and included thrust plate are eliminated to dispose the inner end portions of said levers in circular alignment, and the oppositely flanged fulcrum block of the main embodiment is modified to enable the flanges to radially stabilize both pairs of levers with the inner ends of the latter adapted to ride the outer diameter of the work element extension aforesaid;

FIG. 13 is a horizontal sectional view similar to FIG. 5 and taken along the line 13—13 of FIG. 12, to show structural details of the operably related circularly aligned reaction-levers and modified fulcrum block in normal position ineffective to transmit reaction from the booster work element to the brake-pedal;

FIG. 14 is a sectional view similar to FIG. 13 but showing the control valve operated to initiate applied position and the operably related reaction-levers tilted for transmission of braking reaction from the master cylinder via the outer valve member to the brake-pedal upon operative energization of the booster servo; and FIG. 15 is an isometric view of the removable fulcrum block per se shown in FIG. 12 for varying the division of work between the driver and the booster servo by substituting optional sizes at will.

Like characters of reference in the several views designate similar and corresponding parts or components.

Figure 1:
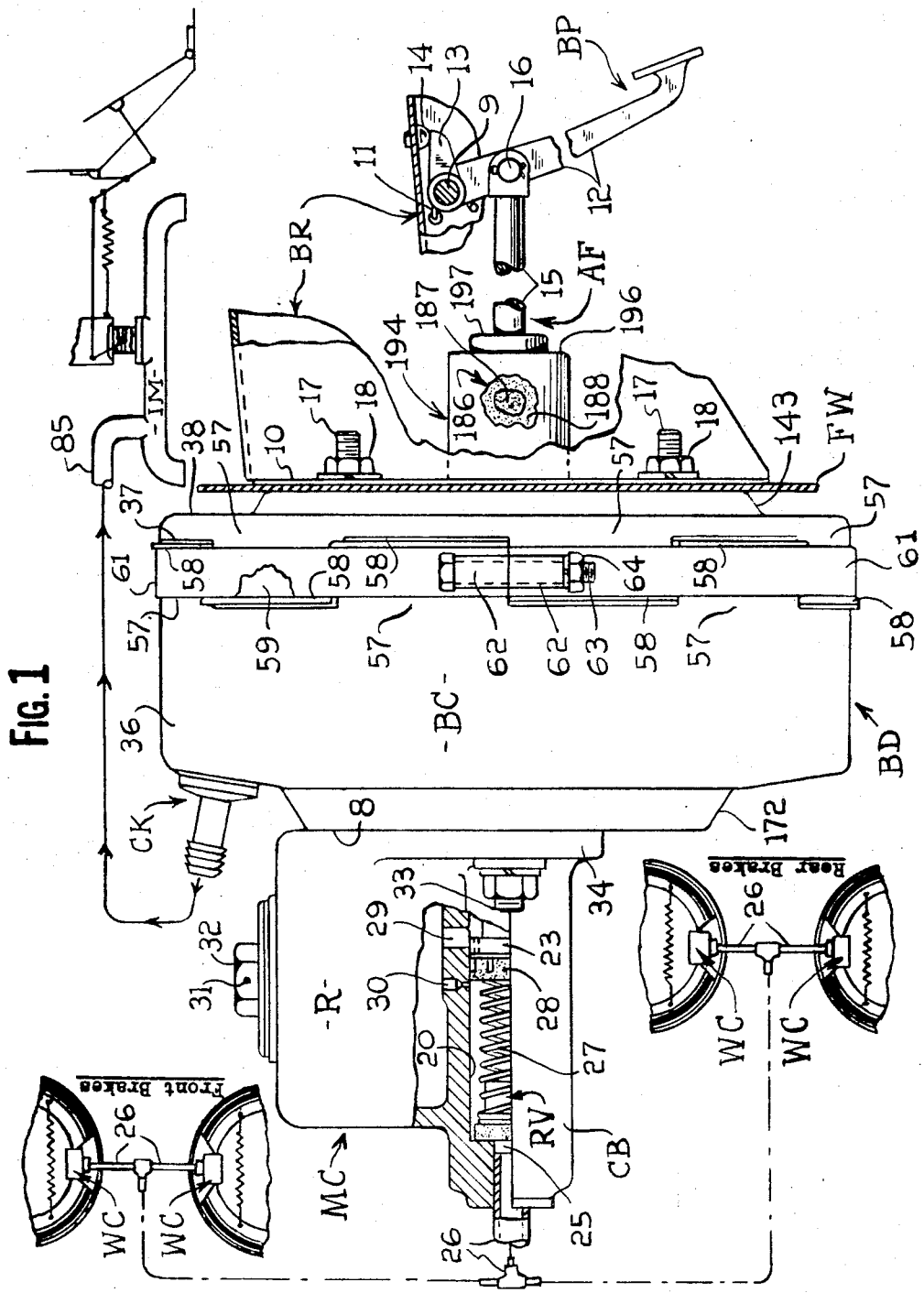
FIG. 1 is a schematic representation in part of an automotive hydraulic systems of known form incorporating a booster mechanism (device) embodying the principles of the present invention with the vehicle brakes and device in normal brake released disposition.

As shown in FIG. 1, a power-brake system incorporating the present invention includes my novel and improved pressure differential operated booster device generally designated "BD" which is provided with a work-performing element (push-rod) 7 operatively projecting into the master brake cylinder MC. The master cylinder MC has a chamber-defining body CB mounted on the front end wall 8 of the booster housing (power-cylinder) BC, the latter being mounted in a well known manner on the engine side of the vehicle firewall FW under control of an operator-operated member (brake-pedal) BP pivotally suspended at its upper end from a cross-shaft 9 supported on a generally U-shaped bracket BR having a pair of spaced outturned flanges 10 fastened on the driver's side of said fire-wall. A torsional spring 11 encircles said cross-shaft with its opposite ends connected under tension to the pedal arm (shank) 12 and said bracket BR, respectively, as shown to bias said pedal toward normal released position defined by an angular short arm 13 fast on and projecting angularly from the upper end of said pedal shank 12 in engagement with a stop element 14 carried by said bracket as shown.

A manual input element (push-rod) 15 is pivotally connected at 16 to an intermediate point on said pedal shank 12. A plurality (preferably four) threaded studs (cap screws) 17 projects rearwardly from the rear end of the booster cylinder BC through a pattern of holes in the aforesaid firewall and bracket flanges in that order to rigidly support the booster device BD in operating position as shown under nuts 18 suitably torqued onto said cap screws 17. The aforesaid pedal BP is connected directly via said push-rod 15 to a portion of a novel and improved poppet-type control valve device generally designated CV for operatively controlling energization and de-energization of the booster device BD under operator follow-up control as is understood.

Referring now to FIGS. 1, 2, 3, 4 and 5, the master brake cylinder MC is representative of the type commercially used on present-day motor vehicles and the like, to actuate known forms of hydraulic brake systems and, therefore, a detailed description of its structure and operation is believed unnecessary for a clear understanding of the present related invention. The master cylinder MC includes the aforesaid chamber-defining body CB, a walled longitudinal bore 20 closed at one end and open at the other end to atmosphere via a surface channel 21 communicating with a passage 22, said bore slidably receiving a spool-type piston 23 having an elongated axial socket 24, said piston being effective when moved from normal position to its dashed line position shown in FIG. 2, to pressurize the brake-fluid and displace the same through a discharge port 25 into the brake lines (conduits) 26 connected to the brake-actuators (wheel cylinders) WC operably related with the vehicle wheel brake assemblies, respectively, as shown in FIG. 1. One end of a normally compressed spring 27 is adapted to react on said piston via its associated piston-cup 28 to normalize the same, and the other end of said spring engages a commercial residual pressure valve RV operably positioned at the inner end of said discharge port 25, and provided with a one-way discharge valve to establish minimum pressure in the brake lines. A fluid-supply reservoir R is incorporated in the cylinder body CB in superposition with respect to the walled bore 20 for gravitational feed into the latter and also serving to maintain the brake system filled by way of the normally open compensating port 29, and intake port 30, respectively. The brake-fluid in the reservoir R and that surrounding the body of the piston 23 is maintained at atmospheric pressure by means of a vent 31 in the filler cap 32.

The master cylinder MC is mounted in operating position on the front end wall 8 aforesaid in coaxial relationship with respect to the booster cylinder BC by means of a pair of mounting bolts 33 extending through two pairs of aligned holes, respectively, formed in said front end wall and a flange 34 integral with and defining the rear end of the cylinder body CB in part as shown in FIG. 1.

The novel booster device BD also referred to as a "-servomotor" or "mechanism" for flexibility in claiming terminology, comprises: the aforesaid booster cylinder BC formed of separable front and rear cup-shaped members (cylindrically-walled shells) 36,37, respectively, interengageable at their respective confronting open ends with the bottom of the former defining the aforesaid end wall 8, and the bottom of the latter defining the rear end aforesaid as a wall 38. An annular auxiliary cup-shaped member (stamping) 39 is adapted to nest within the rear shell 37 as shown in FIG. 2, and is characterized by a cylindrical flange 40 radially spaced from the interengaging portions of said shells 36,37, and normal to its bottom wall 41 offset rearwardly at 42 for stiffness is a juxtaposed complementally offset at 43 in the rear end wall 38. The aforesaid mounting cap screws 17 pass through a pattern of holes in the bottom wall portion of the offset 42 in alignment with a matching pattern of holes through the aforesaid rear end wall offset 43, firewall FW and bracket flanges 10 aforesaid with the heads of said capscrews in engagement with the marginal surfaces defining the holes in the wall 41 to clamp the latter, wall 38, firewall FW and bracket flanges 10 in that order in a rigid unitary assembly as shown in FIGS. 1 and 2 under nuts 18.

Normally nesting within the aforesaid auxiliary stamping 39 is an annular cup-shaped power-member (stamping) 44 having a peripheral flange 45 normal to its bottom wall 46 and radially spaced from the flange 40, said flange 45 and wall 46 being adapted to support an inner segment (leg) 47 of a looped-configuration defining the peripheral margin of a vertical wall 48 forming an annular flexible power-diaphragm PD, said flange 40 being radially spaced from the interengaging portions of said shells 36,37 (see FIGS. 2 and 9) for reception of an outer segment (leg) 49 of said diaphragm loop, and is provided with a centrally disposed annular channel 51 in arcuate cross section to receive a complementally formed annular bead integral with said outer diaphragm leg 49 (see FIG. 9), to stabilize the latter with respect to the flange 40 during telescopic installation relative to the cylindrical wall defined by said shell interengaging portions. An annular bead 53 defines the inner periphery of said power-diaphragm PD, and is subjected to airtight compression in a complementally formed annular channel 54 defined by an annular pressure flange 55 spaced from the confronting face portion on the aforesaid power-member wall 46, and defining the outer peripheral margin of a ported closure plate 56 to be hereinafter referred to in greater detail.

The interengaging portions aforesaid for interlocking the two shells 36,37 to produce said booster cylinder BC, comprise: a plurality of circumferentially spaced alternately interengaging arcuate segments 57 integrally formed from the cylindrical walls of said shells 36,37 at their respective open ends (preferably five segments on each shell). Each of said segments 57 is characterized by a terminal outstanding complemental flange 58 in alternately spaced circular relationship to produce an annular channel 59 therebetween around the exterior of the booster cylinder BC (see FIG. 1), and a metallic clamping member (ring) 61 of the same width as said channel 59 and engaging the bottom thereof and said outstanding segmental flanges 58, is adapted to effect radially inward pressure on said interengaging segments 57 to anchor the outer diaphragm leg 49 of the diaphragm loop airtight against said flange 40 and at the same time stabilizing said pair of shells 36,37 in coaxial relationship against fortuitous separation by alternate engagement of said interengaging segments 57 best demonstrated in FIGS. 1, 2 and 9. The said clamping ring 61 is split, and at opposite ends of said split is a pair of extruded semicircular hollow bosses 62, respectively, which receive a headed clamping bolt 63 to draw the interengaging segments 57 into a true circle under a nut 64 and thereby effecting coaxial airtight assembly of the booster cylinder shells 36,37 as shown in FIGS. 1 and 2.

The central portion of the aforesaid power member 44 comprises: a cylindrically walled cup-shaped valve housing 65 having a forward closed end and its opposite open end terminates in an integral outstanding circular flange 66 provided with a plurality of threaded holes 67 (preferably six) equally spaced around its peripheral margin defined by an annular offset 68 which produces an annular shoulder at 69 engageable by the inner peripheral margin of the aforesaid power-member wall 46 flush with the rear face of the normal thickness of said flange 66. A plurality of cap screws 71 projects through a like-pattern of aligned holes in the peripheral margin of said backing plate 56 and inner peripheral margin of said power member wall 46 into threaded engagement with the holes 67 in the flange offset 68 as shown in FIG. 2 to produce a unitary assembly thereof. The aforesaid backing plate flange 55 is centrally formed with an annular coaxial walled extension 72 defining with the interior of said housing 65 a "valve-cage." A plurality of air-vacuum ports 73 passes through said walled extension which integrally terminates in an inturned annular flange 74 normal to said extension and in spaced relation to said backing plate flange 55. The right face of the aforesaid flange 74 is normally disposed in abutting relation to the confronting inner peripheral portion of the shell 37 to establish the unapplied position of said control valve device CV. An annular support flange 75 projects rearwardly into a spaced terminal outstanding flange 76 to produce an annular channel 77 defining the inner peripheral margin of said shell 37.

The booster power-cylinder BC is divided into a constant negative (vacuum) pressure chamber 78 and a variable pressure (air-vacuum) chamber 79 by means of the aforesaid power-member 44 and associated flexible roll-type power-diaphragm PD which produce in combination a "movable wall" or "power-piston assembly" generally designated PP, said booster chambers 78,79 being under balanced negative (vacuum) pressure when said power-piston PP is in normal "power-off" position shown in FIG. 2 corresponding to full release of the vehicle brakes as shown in FIG. 1, and thereby producing what is known in the Industry as a "vacuum-suspended brake booster." The constant pressure chamber 78 continuously communicates with a source of vacuum production such as the vacuum condition created within the intake-manifold IM in operative association with the carburetor and connecting accelerator pedal linkage schematically represented in FIG. 1, when the vehicle internal-combustion engine is operating, via a known form of one-way check-valve CK embodied in the angular portion of the aforesaid front end wall 8, said check-valve having a circular valve element (disc) 81 characterized by a fixed central portion 82 and a resilient marginal portion 83 adapted to block incursion of air via ports 84 into the chamber 78. A vacuum conduit 85 interconnects the intake-manifold IM with the chambered-body 86 of the check-valve CK as shown in FIGS. 1 and 2.

The forward end of the aforesaid housing 65 is closed by an integral relatively thick wall 87 having a plurality of circumferentially spaced cylindrical chambers 88 (preferably four), a central bore 89 leading to each of said chambers, an annular V-shaped groove 91 in the wall of each chamber 88 in spaced relation to the forward open end thereof, a plurality of angular vacuum passages 92, an axial bore 93 and an annular forwardly offset boss 94.

Reference is now made to my novel and improved poppet-type control valve device CV of simplified construction and more efficient operation, and which comprises: an annular outer and an inner telescopically-related fluid-controlling element generally designated OE and IE, respectively, said control elements being arranged in coaxial overlapping (interfitting) relationship best demonstrated by FIG. 3, to the axis of the booster device BD. The outer control element OE is disclosed herein as a tubular valve sleeve 95 adapted for its forward end to engage a plurality of short thrust-transmitting rods (pins) 96, preferably four, which are slidably disposed in said central bores 89, respectively, passing through that portion of the end wall 87 closing the rear ends of said chambers 88 (see FIG. 3). The exterior of said outer valve sleeve 95 is radially spaced from the confronting cylindrical interiors of said housing 65 and walled extension 72 to provide an annular air-vacuum chamber 98 operably receiving a normally compressed spring 99 reacting between that portion of the end wall 87 radially exterior of an imaginary circular tangent to the outer ends of the diameters of said thrust pins 96, and an annular outstanding flange 101 defines the rear end of said outer valve sleeve 95 as shown and thereby enabling said last-defined spring to bias said outer valve sleeve 95 relatively to said power-piston PP toward normal unapplied position wherein said flange 101 engages the left face of the aforesaid inturned flange 74.

A threaded counterbore 102 is provided in the rear end portion of the outer valve sleeve 95, and projecting medially from the interior of said outer valve sleeve 95 is an annular wall 103 defining an axial bore 104 therethrough, with its right side characterized by an annular valve seat 105 associated with an annular air-vacuum chamber 106 for maintaining communication between the latter and chamber 98 via a plurality of air-vacuum passages 107 intersecting a like-plurality of radial air-vacuum passages 108 formed in said annular wall 103 as shown.

An annular spring chamber 109 is defined by the left side of said wall 103 and the normal cylindrical interior surface of said outer valve sleeve 95.

The inner control element IE is disclosed herein as a tubular valve sleeve 110 slidably interfitting the axial bore 104 through the wall 103 in airtight sealing relation. The rear end of said inner valve sleeve 110 terminates in an annular outstanding flange 111 having a peripheral valve face 112, preferably formed of molded rubber, and adapted to normally engage the aforesaid valve seat 105 to produce an "air-valve" generally designated AV in closed position. The left end portion of said inner valve sleeve 110 is provided with a reduced diameter threaded portion 113 terminating in an annular shoulder 114 which threadingly receives a horizontal annular sleeve (collar) 115 in engagement with the aforesaid annular shoulder 114. Radially outstanding from the engaging end of said collar 115, is an annular flange 116 provided with an annular peripheral offset 117 for reception of a complemental annular valve face 118, preferably formed of molded rubber, said valve face 118 being normally spaced axially from a confronting valve seat 119 defining that portion of the end wall 87 radially interior of an imaginary circle tangent to the inner ends of the diameters of said thrust pins 96, and thereby producing the open position of a "vacuum-valve" generally designated VV.

The left end of the inner valve sleeve 110 is spaced from an end wall 121 of an annular recess (cavity) 122 formed in the central portion of the end wall 87 and with which the aforesaid angular vacuum passages 92 communicate. Each of the aforesaid chambers 88 is fitted with an annular double-lip rubber seal 123 through which said thrust pins 96 pass to seal the chamber bore 89 and thereby limiting communication between opposite sides of the end wall 87 via said angular vacuum passages 92.

The axial bore 93 aforesaid through the end wall 87 is coaxial with and of the same diameter as an axial bore 124 through the aforesaid inner valve sleeve 110, and slidably projecting through said coaxial bores 93,124 is an extension 125 produced by diminishing the normal diameter of the aforesaid booster push-rod 7, to form an annular shoulder 126. Medially disposed in that portion of said push-rod extension 125 is an annular groove 127 fitted with a complemental pliant seal 128 to prevent leakage between the inner valve sleeve 110 and said push-rod extension 125, and the right end of said extension 125 is provided with a concavity 129 opening into an annular chamfer 131 defining the right end of said bore 124 as shown.

A conical-type compression spring 132 is operably disposed in the constant pressure chamber 78 of the booster cylinder BC to continuously react between the offset portion of said front end wall 8 and a seat 133 provided by the intersection of the housing 65 with its integrated annular flange 66, said last-defined spring serving to continuously bias the power-piston PP toward normal position shown in FIGS. 2 and 3.

A normally compressed valve spring in the form of two juxtaposed Belleville (dished) washers 134, is confined within the aforesaid spring chamber 109 with their outer peripheries in contact and their inner peripheries in spaced relation in engagement with said annular flange 116 and the inner peripheral margin of the left side of said wall 103 as shown, to bias said outer and inner valve sleeves 95,110 apart and thereby effecting engagement of the aforesaid valve seat and face 105,112, respectively, to close the aforesaid "air-valve" AV.

Attention is now directed to the aforesaid novel and improved four-lever force and reaction-transmitting assembly (device) generally designated RD which is operatively disposed between the push-rod shoulder 126 and the end wall boss 94 aforesaid as shown in FIGS. 2 and 3. With particular reference to FIG. 2, it will be noted that the forward axially adjustable end 135 of the booster push-rod 7 is adapted to operably project through a pair of coaxial annular lip-type sealing elements 136,137 on opposite sides, respectively, of an integrated vertical wall 138 having a peripheral tapering wall 139 producing a frustrum profile best shown in FIG. 2, said walls 138,139 being stabilized between the wall of the open end of the aforesaid master cylinder bore 20 and an integral extrusion 141 from the central portion of the front end wall 8 complemental to the configuration of the walls 138,139 best demonstrated by FIG. 2. The end of the adjustable portion 135 of the booster push-rod 7, is adapted to enter the socket 24 in the master cylinder piston 23 in normally spaced relation with respect to the bottom of said socket and engageable therewith to actuate said piston 23 in a fluid-pressurizing direction to effect a brake-applying operation. Protractive movement of the outer valve sleeve 95 and the power-piston PP is transmitted to said booster push-rod 7 through mechanical connections provided by a four-lever reaction assembly generally designated LA. The reaction-lever assembly comprises: four radially-disposed levers L equally spaced circumferentially at 90° to each other with their outer reduced width ends 142 confined in complemental cutouts 143, respectively, formed in a cylindrical wall 144 normal to an annular vertical wall 145 defining a cup-shaped reaction member generally designated 146. The inner periphery of the vertical wall 145 is adapted to have bearing (sliding) support on a circular shoulder 147 defining the outer periphery of the aforesaid boss 94 projecting from the central portion of the aforesaid end wall 87. The outer ends of the aforesaid angular vacuum passages 92 pass through the peripheral portion of said boss 94. The aforesaid thrust pins 96, each terminates at its forward end in a reduced shouldered portion 148 formed by diminishing the normal diameter thereof and also passes through a hole 149 of a matching plurality so that manual thrust motion applied to the outer valve sleeve 95, is transmitted via said thrust pins to said reaction member 146 to move as a unit with said valve sleeve 95 as shown.

Integrally projecting from the periphery of the aforesaid vertical wall 145 in alignment with each of said cutouts 143, is an angular pressure flange 151 to provide a pressure line (point) for the outer reduced ends 142 of each of said reaction-levers L. The reduced width of the outer end portions produces opposing retaining shoulders (abutments) 152 with the normal width of each lever, for close adjacency (engagement) with the walled ends defining each of said cutouts 143 to prevent fortuitous radial displacement of said levers out of normal operating positions shown in FIG. 4. The inner end portions 153 of each lever L are provided with arcuate cutouts 154 respectively which straddle-mount substantially half of the diameter of the circularly aligned portion of the aforesaid push-rod extension 125 in 90° spaced relation as shown in FIG. 4.

The four reaction-levers L are arranged in two aligned pairs as shown in FIG. 4 with one pair perpendicular and the other pair horizontally disposed. The outer end portions 142 are in circular alignment in engagement with their respective pressure flanges 151 and the inner end portions 153 of the perpendicular pair of levers L are in alignment with their respective outer end portions 142 while the inner end portions of the horizontal pair of levers L are offset forwardly at 155 parallelly to their respective outer end portions 142, the latter being circularly aligned with the corresponding end portions of the perpendicular pair of levers L (see FIG. 5). Operably disposed in series in the space normally obtaining between the push-rod shoulder 126 and the end wall boss 94 aforesaid when the reaction-levers L are normal to the axis of the push-rod 7 in ineffective positions to transmit reaction as shown in FIGS. 2 and 3, are a thrust washer 158 between the right faces of the inner end portions 153 of the perpendicular pair of levers L and the aforesaid boss 94, and another thrust washer 159 disposed between the left faces of the inner end portions 153 of the perpendicular pair of levers L and the right faces of the offset inner end portions 153 of the horizontal pair of levers L, and the left faces of the inner end offset portions 153 are contiguous to the inner right face of a novel removable pressure-distributing member (fulcrum block or plate) 160 comprising a rectangular plate 161 with a central hole 162 through which said push-rod extension 125 passes to enable said plate to seat against the aforesaid shoulder 126. Projecting rearwardly from the top and bottom edges of said plate 161, is a pair of parallelly spaced flanges 163 to provide pressure lines 164,165 for intermediate points on said perpendicular pair of levers L, and at 166,167 on the plate proper are pressure lines for intermediate points on said horizontal pair of levers L (see FIG. 10). Accordingly, a straddle-mounting of the inner end portions 153 of the four levers L on the reduced extension 125 of the booster push-rod 7, cooperates with the cutouts 143 in the reaction member 146 and retaining shoulders 152 on the reaction levers L and confinement of the inner end portions 153 of the horizontal pair of levers L between said flanges 163, to stabilize the reaction-lever assembly LA in operating position as shown in FIGS. 2, 3, 4 and 5.

Movement of the power-piston assembly PP under a pressure differential acting on opposite sides thereof, and manual movement of the outer valve sleeve 95 are transmitted to the booster push-rod 7 through the aforesaid fulcrum block 160 which includes the aforesaid reaction-levers L acted on at their outer end portions 142 by the aforesaid pressure flanges 151 formed by the metal extruded to produce the cutouts 143 in the reaction member 146, and their inner end portions 153 in contact with the thrust washers 158,159 and boss 94, to move the output push-rod 7 under movement of said reaction-levers rocking in a counterclockwise direction about intermediate portions on said levers in engagement with the aforesaid pressure lines on said fulcrum block 160, while booster force is transmitted to the output push-rod 7 under movement of the inner end portions 153 of said levers L rocking clockwise with their outer end portions substantially stabilized under manual force, and thereby jointly exerting a force on the fulcrum block 160 effective to move the booster push-rod 7 in a fluid-pressurizing direction as is understood.

The reduced extension 125 first passes through said central hole 162, and thence through a pair of coaxial holes 168,169 in the aforesaid thrust washer 158,159, respectively, and coaxial hole 93 in the boss 94, to operably support the fulcrum block 160, thrust washers 158,159 in coaxial alignment including the interengaging straddle-mounted inner end portions 153 of the levers L in contiguous surface engagement when the booster chambers 78,79 are under balanced negative (vacuum) pressure as shown in FIGS. 2 and 3 wherein the two booster chambers are interconnected via said angular vacuum passages 92, open (unseated) "vacuum-valve" VV, air-vacuum-chamber 98 and air-vacuum ports 73.

It is thus seen that by providing the aforesaid novel removable fulcrum blocks 160, that optional sizes may be provided to change the effective ratio within said reaction-lever assembly LA with resultant corresponding changes in the division of work between the driver and the booster servo BD. For example, fulcrum plates 161 may be made available in three optional sizes to provide "light," "medium" or "heavy" pedal pressure to customize the latter according to the car driver's choice thus overcoming in a simple mechanical manner the problem of oversensitivity connected with power braking.

A normally compressed helical-type reaction and return spring 171 operably encircles a portion of the aforesaid booster push-rod 7 and continuously reacts between the centrally offset portion 172 of said front end wall 8 and the outer circularly aligned portions of said reaction-levers L with opposite ends of said spring being maintained in operating alignment by the aforesaid cup-like extrusion 141 and the interior surface of the cylindrical wall 144, respectively, of the aforesaid reaction member 146, said spring 171 serving the twofold purpose of providing immediate reaction (resistance) to brake-pedal depressing movement in a fluid-pressurizing direction and of returning the reaction-lever assembly LA to normal ineffective position to transmit reaction and the outer valve sleeve 95 in cooperation with the valve return spring 99 and with the valve spring 134 in part, toward normal position shown in FIGS. 2 and 3 wherein the said control valve device CV is in unapplied position.

Projecting from the central portion of the rear end wall 38 of the aforesaid booster cylinder shell 37 is an elongated tubular valve extension 175 projecting coaxially with respect to the aforesaid outer valve sleeve 95 and formed at its forward end with a threaded annularly flanged portion 176 which threadingly engages the threaded counterbore 102 aforesaid defining the rear end portion of said outer valve sleeve 95, to produce a unitary coaxial assembly thereof, said valve extension 175 having an external annular groove 177 spaced rearwardly of said flanged portion 176 and an elongated truncated hollow member (stamping) 178 closed at its forward end 179 and terminating at its open end 180 in an annular outstanding flange 181 adapted to continuously engage the rear end of said valve extension 175 as shown to enable manual thrust movement of said valve extension 175 and hollow stamping 178 as a unit in valve-applying and unapplying directions of movement, the latter movement being effected by spring reaction and the valve-applying movement being effected by the ball-end 182 of the aforesaid booster input push-rod 15 projecting into said hollow stamping 178 into engagement with the closed end 179 thereof. A pair of diametrically opposed air-ports 182 passes through the wall of said hollow member 178 adjacent its closed end as shown to provide incursion of air via an annular air-filter AF having a sponge-like filter element 184 encircling said input push-rod 15 and overlying the open end of said hollow stamping, into the interior of said valve extension 175 via said ports 183, thence into a cylindrical air-chamber 185 formed between the threadingly connected end portions of said outer valve sleeve 95 and flanged portion 176 on said valve extension 175 in continuous communication with the aforesaid "air-valve" AV.

The thickness of the valve extension wall is reduced from the right side of the aforesaid annular groove 177. Projecting coaxially from the central portion of the rear end wall 38 of the booster cylinder shell 37, are support and sealing means herein disclosed in the form of a flexible roll-type member 186 having a pair of elongated radially spaced inner and outer walls 187,188 disposed in parallellism integrally connected at one end by a curving wall 189 to induce rolling-action therebetween from that end when the inner wall 187 is longitudinally moved as a unit with the extension 175 of the outer valve sleeve 95, relatively to the outer wall 188 resulting in lengthening of the former wall and shortening of the latter wall best demonstrated by FIG. 6. The open end between said walls 187,188 is defined by a pair of annular radially spaced beads 190,191, respectively, which is adapted to engage the aforesaid annular groove 177 and the aforesaid annular channel 77, respectively, the latter channel defining the inner peripheral margin of the rear cylinder shell 37 best demonstrated by FIG. 3. Accordingly, the open end of the outer wall 188 is stabilized and the open end of the inner wall 187 is connected to said valve extension 175 to slidably move as a unit therewith, and thereby inducing rolling-action of the curving closed end 189 to accommodate reciprocative movement of said valve extension 175 and connected outer valve sleeve 95 to place said control valve device CV in its applied and unapplied positions of control.

The normal wall thickness at 192 between the rear side of the aforesaid flanged portion 176 and the annular groove 177, is equal to the combined thicknesses of the inner wall 187 and reduced wall thickness of the valve extension 175 to the right of said annular groove 177. The combined wall thicknesses slidably project through an opening 193 defined by the aforesaid annular support flange 75 to slidably support and seal the working surfaces between said opening 193 and exterior cylindrical surface of said inner wall 187 as shown, and thereby maintaining the closed end of said hollow stamping 178 and confronting complemental end of the reduced valve extension 173 in coaxial relationship for engagement, in the event of power-run-out or booster failure, to enable operator force to be directly applied to the booster push-rod 7 to actuate the master cylinder MC in a fluid-pressurizing direction to apply the vehicle brakes as is understood.

The aforesaid outer wall 188 is enclosed in a cup-shaped shell 194 having a forward open end 195 in telescopic compressing engagement with the outer surface on the aforesaid annular bead 191, and the closed end is defined by an integral wall 196 having a cylindrically extruded chamber portion 197 defining an annular chamber 198 for reception of the aforesaid air-filter element 184. A central hole 199 in the extruded portion, through which said booster input push-rod 15 loosely projects, is adapted to accommodate ingress of air through said filter element 184 into the interior of said hollow stamping 178.

It is thus seen from the immediately foregoing description that the flexible support and sealing member 186 which may be termed a "sleeve-type boot," is characterized the threefold functions of (1) to serve as a bearing support for the extension 175 and connected outer valve sleeve 95 of the control valve device CV, on the rear shell 37 of the booster cylinder BC, (2) to seal said valve extension 175 at its bearing point aforesaid, and (3) to exclude dust and other foreign material harmful to the working surfaces within the booster mechanism.

FIG. 10A illustrates a modified form of the fulcrum block 160 shown in FIG. 10, and is designed to eliminate straddle-mounting of the inner ends of the four reaction levers La in favor of the inner ends riding the outer cylindrical surface of the booster work element extension 125a. Structure analogous to that disclosed in FIG. 10 is identified by the same reference characters distinguished, however, by adding the letter "a" in exponential position with respect to the base character.

A pair of lateral extensions 207,208 is added to each of the flanges 163l with the rear ends thereof spaced for reception of the inner end portions 153a of the perpendicular pair of levers La, and the beveled edges 164,165 of FIG. 10 are replaced by edges 164a, 165a parallel to the plate 161a proper as shown, to provide pressure lines for the intermediate portions of the latter pair of levers La to bear against. Projection of the inner end portions 153a thru the space between said flange extensions 207,208 into engagement with the work element extension 125a is effective to stabilize the corresponding levers La in part in operating positions, and since the horizontal pair of levers La are similarly stabilized between the flanges 163a, all four levers are maintained in correct operating positions with their inner ends clustered around the work element extension 125a as shown in FIG. 4 of the main embodiment. The pressure lines defined by the edges 164a and 165a are equidistant with respect to the pressure lines 166a and 167a on the plate 161a proper enabling the lever-action against the fulcrum block 160a to transmit balanced force to the booster push-rod 7a.

In operation, this modified fulcrum block 160a is identical to that described in connection with the fulcrum block shown in FIG. 10 and interchangeable therewith, and also provides easy exchange at will of different sizes to change the pedal pressure to suit driver's preference.

FIG. 11 illustrates a modified form of the control valve device CV in which structure analogous to that used in the main embodiment (FIGS. 1–10) is identified by the same reference characters distinguished, however, by the addition of the letter "$b$" in exponential position with respect to the base character. This modified control valve device $CV^b$ comprises: an annular channel 201 in the former valve seat 105 of the "air-valve" AV fitted with an annular resilient member (O-ring) 202 as shown to produce a replaceable valve seat therefor. Another annular channel 203 formed in the aforesaid valve seat 119 of the "vacuum-valve" VV, is similarly fitted an annular resilient member (O-ring) 204 as shown to produce a replaceable valve seat therefor. This modified arrangement enables elimination of the annular resilient valve faces 112, 118 thus restoring their respective support flanges 111, 116 to normal thickness throughout so that selective engagement is provided directly with their respective modified valve seats 202,204.

A further modification is disclosed in the abovedescribed modified control valve device $CV^b$, by substituting a conical helically formed normally compressed spring 205 for the aforesaid double Belleville spring washers 134, operably positioned between the outer and inner valve sleeves $95^b$, $110^b$ to bias them apart toward normal unapplied position wherein said "air-valve" $AV^b$ is closed (seated) and the "vacuum-valve" $VV^b$ open (unseated) to place the booster chambers $78^b$, $79^b$ in communication with each other at equivalent negative (vacuum) pressures to vacuum-suspend the aforesaid power-piston assembly $PP^b$ in normal "power-off" disposition under joint reaction from springs $132^b$, $171^b$ corresponding to the aforesaid control valve device $CV^b$ in unapplied position under joint reaction from springs $171^b$, $99^b$ and 205, the latter spring cooperating in part only. The right side of the flange $116^b$ is provided with an annular offset to produce an annular shoulder 206 to serve as a spring seat for the smaller end coil of the aforesaid spring 205 as shown.

In operation, this modified control valve $CV^b$ is identical to that of the main disclosure shown in FIGS. 1 through 10 hereinbefore described in detail. However, a more effective sealing of the valves $AV^b$ and $VV^b$ against leakage is provided by utilizing circular line-contact between the cooperating valve faces and seats with resultant less sensitivity to minor radial deflections (disalignments) between the inner and outer valve sleeves $95^b$, $110^b$, respectively, likely to impair full (square) seating as would be the case with surface contact as employed in the main embodiment.

This modification also provides easy and economical servicing of the critical valve parts subject to wear and/or leakage by utilizing commercial O-rings for the valve seats.

Reference is now made to another embodiment of the force and reaction-transmitting mechanism RD in the form of a modification $RD^c$ shown in FIGS. 12, 13, 14 and 15 wherein structure analogous to that used in the main embodiment (FIGS. 1–10) is identified by the same reference characters distinguished, however, by the addition of the letter "c" in exponential position with respect to the base character. This modified reaction mechanism is designed to eliminate the offset inner end portions 153 of the horizontal pair of levers and the thrust washer 159 between the two pairs of levers to enable all four levers to be arranged in the same plane with their respective inner ends riding the outer cylindrical surface of the reduced extension 125c on the booster work element 7c. Also, the retaining shoulders 152 on the outer end portions of the levers are eliminated thus providing uniform width of the levers throughout.

As shown in FIG. 12, this modified force and reaction-transmitting mechanism is generally designated RDc and comprises a four lever reaction assembly generally designated LAc in which the perpendicular pair of levers $L^w$ is wider than the horizontal pair of levers Ln in equally spaced circumferential relation at 90° to each other with their outer ends 210,211 confined in complemental cutouts 212, 213, respectively, formed in the cylindrical wall 144c normal to the annular vertical wall 145c defining the aforesaid cup-shaped reaction member 146c. The inner periphery of the vertical wall 145c is adapted to have bearing (sliding) support on the circular shoulder 147c hereinbefore described in connection with the main embodiment (FIGS.1–10).

The angular pressure flanges 151c integrally projecting from the periphery of the aforesaid vertical wall 145c, are extruded from the cylindrical wall 144c to produce the cutouts 212 and 213, the ends of said flanges providing pressure lines for the outer ends 210,211 of the levers $L_w$ and $L_n$, respectively. A metallic clip 214 is secured to the backside of each of said flanges 151c as by a rivet 215 or otherwise, and is provided with a forwardly projecting segment 216 overlying the outer end of each of said reaction-levers to prevent fortuitous radial displacement thereof.

The inner ends 217,218 of the levers $L_w$ and $L_n$, respectively, are adapted to ride the confronting outer cylindrical surface of the push-rod extension 125c and thereby radially confining the reaction-levers between their respective overlying segments 216 and said extension 125c without inhibiting rocking movement of said levers when conditioned to transmit reaction from the booster push-rod 7c to the brake pedal BPc as is understood.

The four reaction levers are arranged in two radially aligned pairs as shown in FIG. 12 with one pair wider than the other pair, that is, the perpendicular pair $L_w$ is wider than the horizontal pair Ln, and all four levers are disposed in circular alignment normal to the axis of the push-rod extension 125c when the power-piston assembly PPc is in normal "power-off" disposition as shown in FIG. 2 of the main embodiment wherein said reaction levers are ineffective to transmit reaction from the booster push-rod 7c via said reaction member 246c, thrust pins 96c, outer valve sleeve 95c, valve extension 175c, truncated member 178c and pedal push-rod 15c.

A novel removable pressure-distributing member (fulcrum block) 160c comprises a rectangular plate 161c with a central hole 162c through which said push-rod extension 125c passes to enable said plate to seat against the aforesaid shoulder 126c on the booster push-rod 7c proper, and projecting from opposite lateral (vertical) edges of said plate 161c is an upper pair of parallelly spaced horizontal flanges 219 and a lower pair of similarly spaced flanges 220 spaced at 221 from the upper pair. A pair of laterally projecting elements 22,223 of substantially the same width as the space between said pairs of flanges, integrally project in the same plane from said lateral edges with the plate proper and normally disposed with respect to said pairs of flanges 219,220. Opposite ends of said elements 222,223 are equidistant with respect to the distance between the top and bottom edges 224,225, respectively, of the plate proper best demonstrated by FIG. 15.

The flanges 219 serve the important purpose of straddle-mounting the inner end portions of the wide reaction-levers $L^w$ to stabilize the latter in operating alignment with their respective pressure lines 226,227 on the fulcrum plate 161c as well as pressure line engagement with the aforesaid thrust washer 158c, as well as pressure line engagement with the aforesaid thrust washer 158c, while the narrow reaction-levers Ln are similarly stabilized with respect to pressure line engagement at 228,229 on the elements 222, 223, respectively, by passing through the aforesaid space 221 between the pairs of flanges 219, 220 into contact with the aforesaid push-rod extension 125c. Accordingly, the two pairs of wide and narrow reaction-levers are stabilized by being straddle-mounted by the two pairs of flanges 219, 220 and the confronting edges thereof defining the space 221.

The purpose in making the perpendicular levers $L^w$ wide and the horizontal levers Ln narrow or vice versa, is to provide sufficient lever strength to carry the workload divided between the driver and the booster servo BDc and to enable the inner ends of all four levers to cluster around the booster push-rod extension 125c thus providing equistant pressure-line contact with the thrust washer 158c so that the reaction-lever assembly LAc will operate at a uniform leverage-ratio according to the effective ratio controlled by the size of the fulcrum block 160c. It is thus seen that all four levers are of the same length while the narrow pair Ln is substantially the same width as the diameter of the extension 125c and the inner end portions thereof project between the inner ends in part of the wide levers $L^w$ into contact with said extension 125c (see FIG. 12).

The inner surface portions on opposite sides of the aforesaid reaction-levers are contiguously confined between the aforesaid thrust washer 158c movable as a unit with said power-piston assembly PPc and the fulcrum plate 161c movable as a unit with said booster push-rod 7c, such surface engagement of the levers at their inner end portions performs the same function as in the main embodiment of rendering the levers ineffective to transmit reaction by virtue of their nonrocking stabilized condition, until pressure-line contacts are established by tilting said levers with respect to the axis of the push-rod extension 125c as shown in FIG. 14. When said levers are tilted in a counterclockwise direction such lever-action is effective to additionally separate the fulcrum plate 161c from the thrust washer 158c as shown in FIG. 14 with resultant pressure-line contacts being established between the inner ends of said levers and said thrust washer 158c, between the the intermediate portion of said levers and said top and bottom edges 224,225 and lateral projecting elements 222,223 of said fulcrum plate 161c proper, and between the outer end portions of said levers and their respective pressure flanges 151c whereby said reaction levers are conditioned to rock counterclockwise on said fulcrum plate 161c under manual force exerted on said push-rod 15c prior to operative energization of said power-piston assembly PPc and operative energization of the latter to effect booster assist, said levers rock clockwise to transmit reactive force from said booster push-rod 7c to the brake-pedal BPc to provide driver awareness of the magnitude of braking force in effect as the pedal BPc is depressed to apply the vehicle brakes as is understood.

The reaction-levers in normal disposition as shown in FIGS. 12 and 13 move as a unit with said reaction member 146c and push-rod 7c including the control valve device CVc in unapplied condition until the booster push-rod 7c encounters sufficient resistance from the fluid column in the brake system reacting on the master cylinder piston 23c, to substantially arrest such unitary movement corresponding to slack take-up throughout the brake system whereupon additional manual force applied to the brake-pedal BPc is effective to actuate the control valve device CVc to applied condition accompanied by tilting of the reaction-levers to transmit reaction upon operative energization of the power-piston assembly PPc under applied condition of the control valve device CVc.

In operation, this modified reaction-lever assembly LAc is identical to its counterpart described in connection with the main embodiment, however, it should be noted that a more simplified mechanism is provided with fewer parts and more compactness than disclosed in the main embodiment with resultant more efficient operation. Moreover, by making available optional sizes in the fulcrum plate 161c, the effective ratio in the reaction assembly may be readily changed by merely removing the master cylinder MCc, then withdrawing the booster push-rod 7c which releases the installed fulcrum block 160c for easy removal and substitution of a different size block to change the division of work between the driver and the booster servo BDc. For example, fulcrum plates may be provided for "light," "medium" or "heavy" pedal pressure and thereby "custom-fitting" pedal pressure to the sensitivity that the driver desires which overcomes in a simple mechanical manner the long standing problem of oversensitivity connected with power braking from its advent.

As in the case of the main embodiment, the reactive and return spring 171c is provided to supply immediate resistance to pedal depression and also serves as a supplemental reactive force to that provided by the four reaction-levers on a proportional basis. The reactive spring 171c and levers produce a two-stage transferral of reaction to the pedal BPc, the spring providing instant opposition to initial pedal depression, while the levers impress a proportional reactive force from the master cylinder MCc against the pedal BPc upon the booster servo BDc becoming operatively energized under applied condition of the control valve device CVc.

OPERATIONAL SUMMARY

Reference is now made to FIGS. 1 through 5 wherein the relative positions of the working parts correspond to the booster device BD being in released "power-off" disposition, that is, the vehicle brakes are released as shown in FIG. 1. The booster chambers 78,79 are at the same sub-atmospheric pressure and are isolated from atmospheric pressure by means of the abovedescribed support and sealing boot 186. Under these conditions, the power-piston assembly PP is at its extreme right position in the booster cylinder BC with the "valve-cage" flange 74 in engagement with the inner peripheral margin of said rear shell 37 defining the forward end of the axial opening 193 through the end wall 38 of said shell. The valve return spring 99 is effective to urge the outer valve sleeve 95 relatively to said power-piston assembly PP toward normal position best shown in FIG. 3 and the pair of Belleville (dished) spring washers 134 have biased said outer and inner valve sleeves 95, 100, respectively, relatively apart to normal positions with the aforesaid spring 99 cooperating therewith to establish the normal position of the outer valve sleeve 95.

The aforedescribed cooperation of springs 99,134 being effective to close (seat) the "air-valve" AV in response to the aforesaid valve face 112 coming into engagement with said valve seat 105, and the "vacuum-valve" VV is open due to the valve face 118 being in spaced (disengaged) relationship with respect to its cooperating valve seat 119 and thereby isolating atmospheric pressure in the air chamber 185 from the variable pressure chamber 79, enabling spring 132 to position the power-piston assembly PP in its extreme right position since both booster chambers 78,79 are in communication with each other via said angular vacuum passages 92, open "vacuum-valve" VV, air-vacuum chamber 98 and air-vacuum ports 73 to the variable pressure chamber 79, thus placing both booster chambers 78,79 under equivalent negative (vacuum) pressure accompanied by negation of pressure differential on said powe-piston assembly PP for movement of the latter under said piston return spring 132 to normal position shown in FIG. 3, and thereby producing what is commonly termed by the Industry a "vacuum-suspended" status of the power-piston assembly PP.

With the booster device BD in its aforesaid released "power-off" disposition as shown in FIG. 3, it is important to clearly point out with special emphasis that the four reaction-levers L are positioned normal to the axis of the booster device with opposing faces of their inner end portions 153 of the pair of perpendicular levers contiguously disposed between the thrust washers 158,159, and the opposing faces of the inner end portions 153 of the pair of horizontal levers are contiguously disposed between the thrust washer 159 and confronting face on the pressure plate 161, thus arranging the aforesaid lever and washer assembly in series between the face of the boss 94 and push-rod shoulder 126 so that the inner end portions of said four reaction-levers L assume surface contact with the pressure plate 161 and thrust washers 158,159 under bias of force transmitted by said reactive and return spring 171 via the outer end portions 142 of said levers and the aforesaid master cylinder piston return spring 27 when the said control valve device CV is in unapplied position as shown in FIGS. 3, 4 and 5 wherein the four reaction-levers L are inoperative to transmit reaction from the booster push-rod 7 to the operator-operated input push-rod 15 which describes an important operating feature of the present booster device BD because the operating force initially applied by the operator (driver) to the input push-rod 15 and connected outer valve sleeve 95 can be made, if desired, effective via said reaction-lever assembly LA moved to reaction-transmitting position, to incrementally increase the space between the push$-rod shoulder 126 and the confronting face of the boss 94 to effect slack take-up in the operating parts between the brake-pedal BP and master cylinder piston 23 prior to or simultaneous with actuation of the control valve device CV to applied position for booster-assist.

The master cylinder return spring 27 cooperates with the valve return spring 99 and reactive and return spring 171 to assist in opposing pedal-actuation of said outer valve sleeve 95, the latter spring being effective to transmit immediate reaction to the outer valve sleeve 95 via the outer end portions 142 of said reaction-levers L in engagement with the aforesaid flanges 151 on the movable reaction member 146 and connecting thrust pins 96 at a proportionally reduced degree according to the leverage ratio effective in the aforesaid force-transmitting and reaction lever mechanism RD.

Attention is not directed to the sequence in applying the vehicle brakes. Foot pressure is applied to the foot-pad of the pedal BP to initially actuate the outer valve sleeve 95 to effect seating (engagement) of the valve face 118 with its cooperating valve seat 119 to close the "vacuum-valve" VV at which point the latter and the "air-valve" AV may be said to be in lapped "holding" position, that is, both valves are closed, and were the vehicle brakes applied, arrest of pedal movement would render such "holding" position effective to stabilize the power-piston assembly PP in a corresponding relative "power-on" position to assist in holding the brakes applied until additional braking force or release of brake pressure is desired by increasing or decreasing, respectively the amount of operator force being exerted on the pedal BP as is understood. This initial actuation of the outer valve sleeve 95 is accompanied by unitary movement of the four thrust pins 96 and connected reaction member 146 and the outer end portions 142 of the four reaction-levers L in engagement with the pressure flanges 151 best demonstrated by FIGS. 6 and 7, to place the reaction-levers L in an angulated (tilted) position with respect to the axis of the booster device BD and thereby conditioning said reaction-lever assembly LA to transmit reaction upon said control valve device being actuated to applied position (see FIG. 8) under operator (manual) force to establish the inner ends of the straddle-mounted levers L in fulcrum line-contact with their respective thrust washers 158,159 to enable rocking movement of said levers L for transmission of reaction from the master cylinder piston 23 to the booster push-rod 7 thus imparting a "-feel" of the amount of brake pressure in effect at any given position of the pedal BP, via the foot of the operator (driver) in engagement with the pedal-pad. Accordingly, the operator is provided with physical awareness of the extent of a brake-application for predictable control thereover resulting in smooth braking control of the vehicle.

The tiled position of the reaction-levers L as shown in FIGS. 6 and 7, is effective to move the fulcrum plate 161 relatively to the boss 94 or vice versa causing interruption of surface-contact extending from the intermediate portion to the inner end of each of said levers L, between the fulcrum plate 161, thrust washer 159 and confronting surface on the thrust washer 158 thus setting up pressure line-contact between the inner ends of said levers L with the aforesaid thrust washers, and the intermediate portions of said levers L in pressure line-contact with the fulcrum plate 161 on the edges 163, 164, 165 and 166 defining the perimeter thereof best demonstrated by reference to the above two figures. Accompanying such tilting operation which merges with or follows initial movement of said manual push-rod 15 to take up slack, the booster push-rod 7 and shoulder 126 thereon are moved relatively as a unit to said thrust washer 158 if said power-piston assembly PP is in "power-off" disposition, due to the lever-action therebetween setting the aforesaid line-contacts requisite for the levers L to have rocking movement at their outer ends on said flanged 151, and their inner ends rocking on said thrust washers 158,159, to establish force and fulcrum points for the levers L which are of the second class when rotating counter-clockwise initially in a brake-applying slack take-up direction.

During the aforesaid conditioning (tilting) of the reactionlevers L to transmit reaction to the pedal BP, it is important to note that even though reaction from spring 171 has been removed from the power-piston assembly PP due to disengagement of the reaction member 146 from the forward closed end 87 of the aforesaid housing 64 (see FIG. 6), the stabilized condition of the booster push-rod 7 and connected master cylinder piston 23 acting on the column of fluid in the brake lines 26 and wheel cylinders WC in full slack take-up condition, is effective to cause the reaction-levers L to rotate in a reverse (clockwise) direction due to booster-assist force at the inner ends of the levers L converting the pressure-distributing member 160 to act as a fulcrum. That is to say, when the pressure member 160 is moving the work-load (piston 23) in a fluid-pressurizing direction, the fulcrum point of the reaction-levers is at their inner ends but when such work-load becomes stabilized, the pressure member 160 serves as fulcrum points for said levers due to clockwise rotation of the levers L under booster-assist effective on the inner ends of said levers L which changes the latter to first class.

Such movement of the inner end portions 153 of the reaction-levers L also effects forward movement of the aforesaid reaction member 146 and booster push-rod 7 as a unit to negate reaction from spring 171 against the aforesaid power-piston assembly PP therefore disengaging said reaction member 146 from the closed end wall 87 of the housing 65 aforesaid centrally located on the left side of said power-piston assembly PP.

During initial movement of the master cylinder piston 23 which may be effected solely under operator force exerted on the pedal BP or jointly by said pedal and said booster device operation, to operatively protract said booster push-rod 7 and master cylinder piston 23 as a unit in a fluid-pressurizing direction, the aforesaid compensating port 29 is lapped (closed) by said piston-cup 28 best shown by dashed lines in FIG. 2.

Upon completion of the aforedescribed initial pedal-actuation to condition the booster device BD for "power-on" operation to assist the operator in effecting a brake-applying operation, the operator encounters hydraulic resistance from the substantially stabilized master cylinder piston 23 and connected booster push-rod 7 requiring that an increasing force be exerted on the pedal BP which causes additional yielding of the valve return spring 99 as well as the Belleville (dished) spring washers 134 accompanied by additional relative movement of the outer valve sleeve 95. Since initial actuation of the outer valve sleeve 95 was effective to engage the valve face 118 with the valve seat 119 of the "vacuum-valve" VV to close and stabilize said sleeve 95 against further movement, it follows that additional relative movement of the outer valve sleeve 95 thereafter under the aforesaid increasing operator force on the pedal BP, would be effective to disengage the valve seat 105 from the stabilized valve face 112 to open (unseat) the "air-valve" AV thus admitting air pressure from air chamber 185 to the air-vacuum chamber 98 thence through the air-vacuum ports 73 into the variable pressure chamber 79 in the booster cylinder BC to create a pressure differential across opposite sides of the aforesaid power-piston assembly PP resulting in movement of the latter in a fluid-pressurizing direction to assist the operator force being transmitted through the input push-rod 15 to the hollow truncated member 178 connected by its flange 181 to the rear end of the aforesaid valve extension 175 projecting through the opening 193 from the outer valve sleeve 95 to the exterior of the booster cylinder BC, to apply the vehicle brakes as required. It should be noted here that upon the power-piston assembly PP moving from its "power-off" position shown in FIG. 3, air admitted to the booster chamber 79 under control of the "air-valve" AV may also flow through the central opening in the aforesaid inturned flange 74 defining the rear end of the aforesaid "valve-cage." Thus, when the power-piston PP is in "power-on" position as shown in FIG. 8, air flow through the open "air-valve" AV may enter the booster chamber 79 via the aforesaid central opening in the flange 74 as well as through the air-vacuum ports 73 in the cylindrical wall 72 of the 37 valve-cage"; but when the power-piston PP is in normal "power-off" disposition shown in FIG. 3 with the "vacuum-valve" VV closed as shown in FIG. 6, the central opening in the flange 74 is blocked by reason of this flange overlying the marginal portion of the rear shell 37 defining the left end of the opening 193. Thus, under the latter condition, initial air flow into the booster chamber 79 must necessarily first pass through the air-vacuum ports 73 to inaugurate operative energization of the power-piston PP IN A BRAKE-applying direction. With the power-piston PP under a pressure differential created in the above-described manner, actuating force is transmitted by the power-piston PP via the reaction-lever assembly LA to the booster push-rod 7 and connected master cylinder piston 23 to pressurize the brake-fluid in the hydraulic brake lines 26 and connected wheel cylinders WC with consequent application of the vehicle brakes and, at the same time, the reactive force from the master cylinder piston 23 is proportionally effective on the pedal BP and power-piston PP according to the division of work as defined by the effective leverage ratio in the reaction-lever assembly LA via the outer ends 142 of the reaction-levers L in engagement with their respective pressure flanges 151 integral with the aforesaid reaction member 146, thrust pins 96 and connected outer valve sleeve 95 and input push-rod 15, and the inner ends of said levers L in engagement with the aforesaid thrust washers 158,159, respectively, and the intermediate portions of said levers L acting on the pressure member 160 connected to the aforesaid booster push-rod 7.

During a brake-applying operation, should the operator desire to "hold" the brakes "on" at their applied intensity, it is only necessary to halt pedal movement which enables the power-piston PP to advance slightly relatively to the outer valve sleeve 95 in a fluid-pressurizing direction to close the "vacuum-valve" VV by positioning the valve face 112 in engagement with its cooperating valve seat 105 to close the "air-valve" AV which produces what is termed a "lapped" closed relation of both valves VV and AV, to stabilize the opposing forces on the power-piston PP to maintain the vehicle brakes applied in accordance with the halted position of the pedal BP as is understood.

My novel control valve device CV produces the well known followup control over power and releasing-movements of the power-piston PP, therefore incremental movements of the pedal BP are effective to cause corresponding movements of the power-piston PP. It is important to stress here that the present booster device BD features a special advantage over prior art booster devices by providing predictable braking control resulting from initial tensioning of the booster working parts to take up any slack (backlash) prior to activating the control valve device CV to applied position effective to induce differential pressure on opposite sides of the power-piston PP to actuate the same. This sequence of operator control over the control valve device CV contributes to smooth braking of the vehicle with minimal effort and pedal movement, and especially is the operator provided with a physical awareness of the degree of braking force in effect at any given position of the pedal BP thus simulating full manual control of the vehicle brakes.

The aforesaid tensioning (slack take-up) operation is a function of manual force applied to the pedal BP and transmitted to the master cylinder piston 23 during relative movement of the outer valve sleeve 95 accompanied by the aforesaid additional separation of the push-rod shoulder 126 and confronting boss 94 and yielding of the aforesaid valve return spring 99 while the return spring 132 for the power-piston assembly PP maintains the latter in its normal "power-off" position as shown in FIGS. 2 and 3. Thus, the normal operating relationship between springs 99 and 132 is such that the compressive working deflection of spring 132 is greater than that of the spring 99 for the latter spring to yield under manual force applied to the outer valve sleeve 95 and, upon the control valve device CV being operated to applied position to create a pressure differential across the power-piston PP to move the same in a fluid-pressurizing direction jointly with said pedal BP under operator force. However, if the compressive working deflection of spring 99 is greater than that of spring 132, initial operator force applied to the pedal BP would be effective to move the power-piston assembly PP and control valve device in unapplied position as a unit including the force-transmitting and reaction assembly RD in normal position ineffective to transmit reaction, to take up the slack until the master cylinder piston 23 encounters sufficient resistance from the column of fluid in the brake system to substantially arrest movement of said piston 23 and connected booster push-rod 7; whereupon, additional operator force applied to the pedal BP would overcome spring 99 accompanied by relative movement of the outer valve sleeve 95, thrust pins 96, reaction member 146 and outer end portions 142 of the aforesaid reaction-levers L, with respect to the power-piston assembly PP to place the reaction-levers L in an angulated (tilted) position with respect to the axis of the booster device BD for transmission of reaction upon the control valve device CV being actuated to applied position as shown in FIG. 8, the aforesaid tilted position of the reaction-levers L being effective to establish the aforesaid force, load and fulcrum pressure lines between the reaction-levers L and the aforesaid flanges 151, distributing member 160, and thrust washers 158,159, respectively, and thereby converting surface engagement to line-engagement there-between to enable rocking movement of the levers L to transmit reaction from the laster cylinder piston 23 to the operator-operated pedal BP.

Further considering the aforedescribed novel slack take up operation, it is important to relate such operation with the predictable braking control aforementioned which is a special and unique feature of the present booster servo BD to enable taking the lost-motion (backlash) out of the operating parts prior to booster assist thus creating a resistance to pedal movement prior to actuating the control device CV to applied position to activate said booster servo BD to assist in applying the vehicle brakes. Due to the perpendicular positions of the reaction-levers L, thais normal to the axis of the servo work element 7 with their inner portions in surface engagement negating rocking movement thereof shown in FIGS. 2 and 3 and reaction from springs 27 and 171, initial manual force applied to the pedal BP serves only to move the control valve device CV as a unit and the reaction mechanism RD in non-reaction transmitting condition until hydraulic pressure ahead of piston 23 in the master cylinder MC builds up to sufficient magnitude to substantially arrest movement of the servo output element 7 and thereby producing a stabilized fulcrum on said distributing member 160 movable as a unit with said booster output element 7 enabling the reaction-levers L to rock to a tilted reaction transmitting positions demonstrated by FIGS. 6 and 8 wherein the space normally obtaining between said distributing member 160 and thrust surface provided by the thrust element 158 has been increased by said tilting action. If such hydraulic resistance were not provided, it would be impossible to change the position of the reaction-levers L to tilted position as shown in FIG. 6 since the reaction mechanism RD would move from its FIG. 3 position to its FIG. 6 position with the reaction-levers still in their normal non-reaction transmitting position even through such initial movement of the pedal BP has actuated the control valve device CV to applied position causing the booster servo BD to be activated short of engaging the closed end 179 of the truncated member 178 with the confronting concave end 129 of the reduced extension 125 on the output element 7. Accordingly, it is seen that the present booster servo BD is inoperative to provide predictable control for the vehicle driver unless the output element 7 encounters sufficient hydraulic resistance in the brake system to substantially arrest movement thereof under force initially exerted solely by the vehicle driver on pedal BP.

Moreover, it is important to note that the relative compressive installation of the springs 99 and 132 bears a direct relationship to the sequence in which the control valve device CV and reaction mechanism RD actuate to their respective applied and reaction-transmitting positions. For example, if spring 99 is installed with a reactive force greater than that of spring 132 then, upon initially operating the pedal BP spring 132 would yield while the normal compressed status of spring 99 would not be altered to enable unitary movement of the power-piston assembly PP from normal position and the valve sleeves 95 and 110 as a unit as shown in FIGS. 2 and 3; whereupon said booster output element 7 encounters hydraulic resistance ahead of the master cylinder piston 23 to substantially arrest movement of the latter thus requiring additional force exerted on the pedal BP to overcome spring 99 resulting in relative movement of the outer valve sleeve 95 with respect to the piston assembly PP followed by relative movement between said valve sleeves 95,110 as shown in FIGS. 6 and 7 accompanied by positioning of the reaction-levers L in reaction transmitting relation with respect to the axis of said output element 7 prior to fully applied position of the control valve device CV being effective; but if spring 99 is installed with less reactive force than that of spring 132, the power-piston assembly PP would remain releasably stabilized under spring 132 in normal "power-off" position as shown in FIGS. 2 and 3 while the spring 99 yields under initial manual force on the pedal BP to actuate the outer valve sleeve 95 relatively to said piston assembly PP to establish the control valve device CV in applied position and the reaction mechanism RD in reaction-transmitting position as a function of the piston 23 in the master cylinder 23 encountering (creating) the aforesaid hydraulic resistance.

Accordingly, it is seen that the operational behavior of the booster device BD, particularly in connection with dampening over-sensitivity, may be varied according to the relative normal compressive installation of the spring 99 and 132 which determines whether initial actuation of the valve device CV as a unit in unapplied position is relative to the power-piston assembly PP releasably stabilized in normal "power-off" disposition as shown in FIGS. 2 and 3 during slack take-up operation, or whether such unitary actuation of the valve device CV occurs simultaneously with movement of said power piston assembly PP from normal "power-off" disposition. That is to say, if the installed compressive deflection of spring 99 is weaker than that of sprig 132, then initial movement of the outer and inner valve sleeves 95,110, respectively, as a unit without modulating spring 132 therebetween, would take effect relatively to the power-piston assembly PP to close the "vacuum-valve" VV as a function of applying additional manual force to the push-rod 15 to open the "air-valve" AV causing introduction of pressure at atmospheric level into the variable-pressure servo chamber 79 to create a pressure differential across opposite sides of said piston assembly PP to operatively activate the same; but, if the installed compressive deflection of the spring 99 is stronger than that of spring 132, then initial movement of the manual push-rod 15 would be effective to move the outer and inner valve sleeves 95,110, respectively, as a unit without modulating the normal status of the spring 134 therebetween, and the power-piston assembly PP simultaneously from normal "power-off" disposition accommodated by yielding of spring 132 under spring 99 without modulating the normal compressed status of the latter. Both of the above described slack take-up operations occur prior to actuating the control valve CV to fully applied position as demonstrated by FIG. 8. It is to be particularly observed with respect to spring 99 that it reacts between the power-piston assembly PP and the outer valve sleeve 95 to provide the aforedescribed unique and novel feature of taking up slack before inauguration of booster assist for smooth mergence of the latter with input operator (driver) force exerted on the pedal BP.

An observation with emphasis in connection with the two operational control methods of the disclosed booster device BD, and described in the paragraph immediately preceding is, that the method wherein the sprig 99 is normally installed with force-transmitting capacity less than that of spring 132 is compatible with low-pedal control characterized by the pedal-pad being close to the floor board. This sacrifices mechanical advantage between the pedal BP and master cylinder MC, which could be important in the event of booster power-run-out or failure; while the method which utilizes spring 99 installed with force-transmitting capacity greater than that of spring 132, enables use of a higher pedal position providing more mechanical advantage for actuating the master cylinder when booster assist runs out or fails completely. Both methods, however, provide the highly desirable operating characteristic of dampening oversensitivity with the former method being less effective in this respect. This dampening effect which is a built-in feature of the present novel booster device BD combined with the interchangeability of the three pressure-distributing fulcrum members shown in FIGS. 10, 10A and 15, provides a wide range of operational characteristics enabling the booster device BD to be customized for brake system on different motor vehicles and the like according to class, weight and other factors dictating a particular type of booster control, especially where oversensitivy is objectionable as with drivers of pleasure cars as distinguished from the general category of commercial vehicles.

As stated above, the outer valve sleeve 95 is connected by the four thrust pins 96 to the reaction member 146 to either move as a unit or through a lost-motion before acting on said member 146 while adjusting the aforesaid reaction-levers L in an angulated (tilted) position for transmission of reaction upon actuating the the control valve device CV to applied position shown in FIG. 8; however, if the thrust pins 96 are predeterminately shortened, the outer valve sleeve 95 would be provided with a lost-motion movement under operator force applied thereto before effecting unitary movement of the aforesaid reaction member 146 and connected outer end portions of said reaction-levers L to dispose the latter in tilted reaction-transmitting positions. This novel and patentable feature enables the establishment of the reaction-levers L in reaction-transmitting positions during that portion of movement of the outer valve sleeve 95 required to open the aforesaid "air-valve" AV. Therefore, conditioning of the reaction-lever assembly LA to transmit reaction occurs simultaneously with movement of the outer valve sleeve 95 to open the aforesaid "air-valve" AV, such conditoning operation requiring less tilting of said levers L than when the full operating movement of said outer valve sleeve 95 is used to place the control valve device CV in applied position corresponding to sequential closing and opening of the two valves VV and AV, respectively.

Accordingly, slack take-up may be effected during movement of the outer valve sleeve 95 to close the "vacuum-valve" VV and open the "air-valve" AV as demonstrated by FIGS. 6 and 8 or, optionally, the thrust pins 96 may be shortened to introduce a lost-motion movement (connection) between the outer valve sleeve 95 and reaction member 146 corresponding to closure of the "vacuum-valve" VV only thus enabling slack-take-up during movement of said outer valve sleeve 95 to open the "air-valve" AV which proportionally reduces the counterclockwise movement of the reaction-levers L to place them in reaction-transmitting condition.

As the power-piston assembly PP moves under pressure differential such power-movement is transmitted via said thrust washers 158,159 to the inner end portions 153 of the reaction-levers L in reaction-transmitting positions, causing their outer end portions 142 to pivot on their respective pressure flanges 151 fast on the reaction member 146 which is held against movement to the right as viewed in FIG. 6 by manual force reacting on the pedal BP which is mechanically connected to the outer valve sleeve 95 as shown and previously described in detail. The intermediate portions of said reaction-levers L push against the pressure-distributing member 160 and thereby moving the aforesaid booster push-rod 7 in a fluid-pressurizing direction to apply the vehicle brakes in part, that is, the power-piston PP pushes the push-rod 7 and master cylinder piston 23 in a fluid-pressurizing direction in cooperation with a follow-up control of relative diminitive manual force applied to the input push-rod 15 with consequent displacement of brake-fluid into the wheel cylinders WC as is understood. A portion of the power application is transmitted through the reaction-levers L rearwardly to the pedal-operated push-rod 15 to provide driver awareness of the degree of effective braking force at the vehicle wheels for predictably controlling the vehicle.

Upon applying the vehicle brakes to the degree necessary, movement of the pedal push-rod 15 is halted causing differential pressures in the booster chamber 78,79 to slightly advance the power-piston PP in a fluid-pressurizing direction which engages the valve face 112 with its cooperating valve seat 105 to close the "air-valve" AV thus placing the control valve device CV in lapped "holding" position, that is, both the "-vacuum-valve" VV and "air-valve" AV are closed and under such conditions, the booster chamber 78 is under vacuum (negative) pressure isolated from the booster chamber 79, the latter being at such greater pressure as to produce a stabilized condition of the opposing pressures effective on the power- piston assembly PP. Accordingly, by maintaining foot pressure on the pedal BP, the vehicle brakes will remain in their existing applied condition with minimal pedal pressure required.

Release of the vehicle brakes from the aforedescribed applied "holding" position, is effected in accordance with the extent and rapidity of removal of operator (manual) pressure from the pedal BP. The pressurized status of the fluid column in the brake lines 26 reacts under the wheel cylinder piston return springs and brake shoe return springs (see FIG. 1), on the master cylinder piston 23 causing the latter to move to the right to normal position wherein the compensating port 29 is uncovered to enable fluid adjustment between that contained in the reservoir R and in the working chamber of the master cylinder bore 20 to atmospheric level in readiness for an ensuing brake-applying operation as is understood. Since the control valve device CV is in "lapped" position just prior to release toward unapplied position shown in FIG. 3 due to pressure differential balancing with work-load reaction to hold the power-piston assembly PP, substantially stabilized the reaction-lever assembly LA moves the outer valve sleeve 95 under influence of both hydraulic and spring forces reacting on the booster push-rod 7, toward normal unapplied position. Such movement of the outer valve sleeve 95 being effective to close the "air-valve" AV and open the "vacuum-valve" VV as a function of cooperation between springs 171,99 and 134 in assuming their respective normal compressive working status (deflection). This brake-releasing operation in cooperation with return of the control valve device CV to unapplied position induces lower pressure in the booster chamber 79 which in turn releases the power-piston assembly PP for movement toward normal "power-off" position under springs 132 and 171 supplemented by hydraulic pressure and the aforesaid spring reaction on the master cylinder piston 23. In this connection, it should be recalled that spring 171 is effective to move the power-piston assembly PP in part to the right only during a releasing operation of the vehicle brakes but in a brake-applying direction, this latter spring is ineffective to oppose movement of the power-piston assembly PP in a fluid-pressurizing direction thus enabling fully power-thrust for booster-assist.

If pedal release is interrupted as by "pumping," for example, before reaching fully released position as shown in FIG. 1, the power-piston assembly PP will continue to assume a right relative position with respect to the outer valve sleeve 95 under springs 27,132 so that the "vacuum-valve" VV is again closed thus placing both valves VV and AV in "lapped" closed relationship which enables the pressure that remains in the booster chamber 79 to maintain the vehicle brakes partially applied at the point of pedal release substantially until the latter is either fully released or farther depressed to increase the intensity of brake pressure as required.

An example of the interchangeability of similar components disclosed in the main embodiment FIGS. 1–10 and in the modified structure shown in FIG. 11, is apparent from a study of their structural and functional relationship such as the valve seats 105 and 119 may be replaced by the disclosed detachable O-ring type seats 202,204 shown in FIG. 11 thus eliminating the molded rubber-like faces 112, 118 and restoring uniformity in the thickness of the flanges 111, 116 to enable line-engagement with the aforesaid seats 202, 204, respectively. Such line-engagement enabling effective sealing of said valves VV and AV in closed positions notwithstanding their cooperating pairs of valve seats and faces, respectively, may be slightly disaligned axially.

The novel interchangeability of the three removable fulcrum blocks shown in FIGS. 10, 10A and 15 enables substitution of different sizes in a selected design to change the division of work between the driver and the booster servo BD. For example, three fulcrum blocks of different sizes may be made available for installation in the present booster servo to provide "light," "medium" to "heavy" pedal pressure. This change in pedal pressure is brought about by installing fulcrum blocks of different sizes to increase or decrease, as the case may be, the distance between the axis of the booster work element 7 and the pressure-line of contact of the fulcrum block with the intermediate portions on the reaction-levers L which changes the leverage-ratio between the extremes of each of said levers. Only a simple manual operation is required to install the selected size of fulcrum block and consists of removing the master brake cylinder MO and then withdrawing the booster work element 7 and included fulcrum block whereupon the desired size is placed on the work element followed by remounting the master brake cylinder on the booster power-cylinder BC as shown in FIGS. 1 and 2. It is thus seen that a series of selective pressure reactions is achieved by merely substituting different size fulcrum blocks between the booster work element 7 and the power-piston assembly PP of the booster servo BD which provides leverage for pedal operation to suit the driver through a range of operations corresponding to light setting of pedal pressure to heavy setting as a function of varying the radial distance between the axis of the booster work element and peripheral edges of the fulcrum block. The effect is to provide a light-to-heavy pedal reaction of the driver, depending on the position of the fulcrum edges that bear on the intermediate portions of the reaction-levers L.

The novel and improved design of the present booster servo BD is an outgrowth of years in the development of booster-type brakes for automotive vehicles and the like. Such extended experience has made it unmistakably clear to me that use of relatively simple sheet metal stampings for the major portion of the structure involved contributes to a simple low-cost product which readily lends itself to quantity production and long service life free of major maintenance expense.

In the event of loss of vacuum, the pedal BP may be moved in a fluid-pressurizing direction to engage the rounded closed end 179 of the hollow truncated member 178 with the complementally formed concavity 129 in the confronting end of the aforesaid push-rod extension 125 to provide "straight-thourhg" transmission of manual force from the pedal BP to actuate the booster push-rod 7 and connected master cylinder piston 23 to apply the vehicle brakes solely under manual force as though the booster device BD were not present, but with greater effort than normally required to operate conventional foot-operated master cylinders since resistance from the springs 27, 171, 132, 99, and 134 plus friction between the working parts as well as working the air through the booster chambers 78,79 via said control valve device CV including reduced purchase for the lower pedal position, must all be overcome solely by manual effort.

The foregoing description considered with the drawing is believed to set forth the achieving of the above-stated objects and the advantages provided thereby. It should be apparent from the disclosure as a whole that the structural and functional nature of the invention represented by the main embodiment (FIGS. 1–10) and related modification shown in FIG. 11, bear distinct patentable relationships. Therefore, the disclosed modification of FIG. 11 does not define an inventive concept separate and distinct from the main embodiment but rather discloses in combination a single inventive concept.

Reference is now made to the terminology used in the foregoing description and in the appended claims in which the identifying expressions and/or terms are intended to convey meanings which include the range of reasonable equivalents in the patent sense. For example, the expressions "booster device," "booster mechanism," "power-brake," "power-cylinder," "-booster cylinder," "servomotor," "movable wall," "-power-piston" "power-piston assembly," "power-diaphram," "power-member," are intended to include any casing and/or chamber having a pressure-responsive movable member therein, whether such member takes the form of a solid piston or a flexible member in part, or some other component serving the same purpose. The terms "front," "forward," "rear," "bottom," "top," "left," and other directional terms or characters are intended to have relative connotation only for convenience in describing the structure as presented on the drawing by way of example, and are not intended to be interpreted as requiring any particular orientation with respect to associates structure external to the present disclosure or the operating position thereof.

Therefore, it should be understood that I do not wish to limit my invention to the above-described novel association and arrangement of elements and details, and that my invention includes such other modifications, substitutions and/or changes obvious to persons skilled in the related art, as defined by the terms of the subjoined claims.

Having thus described my invention I claim:

1. For use as a brake booster, a vacuum-operated servomotor comprising structure defining a fluid chamber enclosure characterized by two separable cup-shaped members having spaced end walls with coaxial central openings, respectively, a source of pressure different from atmosphere, a source of atmospheric pressure, power-piston assembly including a coaxial cylindrically walled valve housing movable as a unit between said end walls from normal position in a pressure-applying direction under a pressure differential at opposite sides of said assembly, the latter serving to divide said chamber enclosure into a constant pressure chamber in continuous communication with said different source of pressure and a variable pressure chamber selectively communicable with said constant pressure chamber and said source of atmospheric pressure, a servo-motor output element, and a pedal-operated input element coaxially related to said output element: a follow-up control valve device characterized by an outer and an inner poppet-type fluid-controlling valve element in telescopic concentric relationship; a pair of axially spaced annular valve faces defines opposite ends, respectively, of said inner valve element; an annular valve seat on said outer valve element normally in engagement with one of said valve faces to produce a closed "air-valve"; an annular valve seat on said valve housing normally spaced from the other valve face to produce an open "vacuum-valve"; a normally compressed spring operably effective between said valve elements to bias them apart to close said "air-valve," said outer valve element being subsequently movable relatively to said inner valve element to engage said other valve face with the valve seat on said valve housing and disengage the valve seat aforesaid on said outer valve element from whereby said "vacuum-valve" is closed and the "air-valve" opened, respectively, corresponding to "applied" position of the control valve device to create said pressure differential across opposite sides of said piston assembly to move the same in said pressure-applying direction; fluid passage means incorporated in said piston assembly between said constant and variable pressure chambers under control of said "vacuum-valve normally open to balance pressures within said chambers; another fluid passage means incorporated in said outer valve element between said one valve face and a portion of said first-defined fluid passage means under control of said "air-valve" normally closed to block ingress of atmospheric pressure into said variable pressure chamber ; multilever force and reaction-transmitting mechanism adapted to mechanically connect said output element, said outer valve element and a thrust surface on said valve housing, the levers of said reaction mechanism being normally disposed normal to the axis of said output element to inhibit transmission of reaction from the latter to said input element; a variable work-load (resistance) initially produced in response to movement of said output element in said pressure-applying direction solely under manual operation of said pedal-operated input element effective to move said pair of valve elements as a unit short of "applied" position, such resistance upon reaching a predetermined magnitude being effective to substantially arrest movement of said output element and thereby conditioning said pair of valve elements for relative movement to said "applied" position and movement of said reaction mechanism to position its levers at an angle to the axis aforesaid of said output element effective to transmit reaction from the latter, under additional manual force exerted on said pedal-operated input element; a tubular extension coaxially connected to said outer valve element and operably projects through the opening in the end wall aforesaid of the cup-shaped member enclosing said variable pressure chamber, to the exterior thereof; mechanical means adapted to interconnect said tubular extension with said pedal-operated input element for actuation as a unit by the latter; and means for sealing and slidably supporting said tubular extension with respect to said last-defined opening, the interior of said tubular extension continuously communicates atmospheric pressure to said "air-valve."

2. The servomotor as claimed in claim 1 in which said fluid chamber enclosure comprises structure defining: a booster power-cylinder in which each of said cup-shaped members defines a metallic shell, said shells being of different depths with marginal portions of their respective confronting open ends characterized by a plurality of alternately interengaging segments, each of the latter having a terminal outstanding flange; an annular channel produced by said flanges around the exterior of the interengaging segments aforesaid; an auxiliary cup-shaped shell having an end wall and a peripheral flange normal thereto with an annular groove formed therein, said last-defined end wall being disposed contiguously with respect to the end wall of said shell of lesser depth and said last-defined flange being disposed in circular alignment with and in radially spaced relation with respect to the interior of said interengaging segments, to produce an annular space therebetween; means including a split-type metallic clamping ring adapted to interfit said annular channel between said flanges for radially impinging the interengaging segments aforesaid in cylindrical alignment; and means for attaching the end walls of said shell of lesser depth and said auxiliary shell, respectively, in a rigid unitary assembly.

3. The servomotor as claimed in claim 2 in which said clamping ring includes structure defining a pair of hollow axially aligned bosses with their respective confronting ends producing the split in said ring; and a fastening element projecting through said bosses to effect clamping pressure on said ring around the interengaging segments of said metallic shells.

4. The servomotor as claimed in claim 1 in which said piston assembly comprises structure defining: a cup-shaped member characterized by a wall having a central opening and a peripheral flange normal to the latter wall; an annular ported closure plate for said opening provided with a central opening, and an annular inturned flange defining the outer periphery of the latter opening which is offset from the confronting face portion on said last-defined wall to produce an annular entrance to an annular channel of similar configuration; a flexible power-diaphragm of annular configuration supported on said last-defined wall by means of an annular bead defining the inner periphery of said diaphragm in compressive engagement in the last-defined annular channel aforesaid under said last-defined peripheral flange and thereby effecting an air-tight seal therebetween with its normal wall thickness radially extending outwardly through said entrance to encompass the exterior of said last-defined wall; a pair of radially spaced circularly aligned inner and outer looped segments defining the outer peripheral margin of said diaphragm; an annular bead defining the inner intermediate portion of said outer segment and adapted to engage the annular groove aforesaid formed in said peripheral flange of said auxiliary shell with said outer looped segment positioned in the annular space aforesaid between said peripheral flange and inner surface on said interengaging segments of said pair of metallic shells, whereby said outer looped segment is confined airtight within said last-defined annular space under compression effected by said clamping ring; and a normally compressed spring is operably disposed in said shell of greater depth to react between a stationary portion of said last-defined shell and the valve housing aforesaid to continuously bias said piston assembly toward normal released position.

5. The servomotor as claimed in claim 4 in which the valve housing aforesaid is of cylindrically walled configuration comprising structure defining a wall closing said one end thereof and its other open end being defined by an annular outstanding flange having a peripheral offset producing an annular shoulder which projects through the central opening in the wall of said last-defined cup-shaped member; a plurality of circumferentially spaced holes in said peripheral offset; matching patterns of holes in the outer and inner peripheral margins of the aforesaid xlosure plate and power-diaphragm, respectively; a like-plurality of fasteners projecting through said plurality and patterns of hokes to produce a rigid airtight unitary assembly of said valve housing, last-defined cup-shaped member, inner annular bead on said power-diaphragm, and the closure plate aforesaid, said valve housing and closure plate being disposed in coaxial relationship to produce a "valve-cage"; a plurality of radially disposed circumferentially spaced cylindrical chambers formed in the end wall of said valve housing; a central opening through the end wall of said valve housing; and an annular thrust-transmitting surface coaxially disposed on the exterior of the end wall of said valve housing and through which the last-defined central opening passes.

6. The servomotor as claimed in claim 5 in which each of said cylindrical chambers is adapted to carry a complemental resilient element, and each of said seal-containing chamber is formed with a closed end and an open end with a hole through the closed end coaxially positioned with respect to a hole defining an annular configuration of said sealing element; and means for stabilizing each sealing element in its associated chamber.

7. The servomotor as claimed in claim 5 in which said outer fluid-controlling valve element comprises structure defining: an elongated cylindrical valve sleeve having an annular outstanding flange at one end and radially spaced from the interior of the cylindrical wall of said valve housing to produce an annular air-vacuum chamber therebetween; a normally compressed spring encircling said valve sleeve is operably disposed in said air-vacuum chamber to react between said sleeve flange and confronting face portion on the closed end of said valve housing whereby said valve sleeve is biased toward normal "unapplied" position wherein said sleeve flange abuts the confronting face portion on the inturned flange of said closure plate; a threaded counterbore is provided in the sleeve flange; an annular wall projects redially inwardly from an intermediate portion of said valve sleeve, and is adapted to provide on one side the first-defined valve seat; an axial bore passes through said last-defined wall; an annular spring chamber defines the the other side of said last-defined wall, said spring chamber being adapted to contain the first-defined spring; said inner fluid-controlling valve element comprising structure defining: another elongated cylindrical valve sleeve slidably disposed in the latter axial bore in airtight sealed relationship therewith; an outstanding flange defines one end of said inner valve sleeve; a peripheral resilient element defines the one valve face carried by said last-defined flange, adapted to normally engage said last-defined valve seat to produce said "air-valve" in closed condition, the other end of said inner valve sleeve is provided with a reduced diameter threaded portion terminating in an annular shoulder which threadingly receives an annular collar in engagement therewith; an annular flange radially outstands from the engaging end of said collar and is provided with a peripheral offset for reception of a complemental resilient element defining the other valve face normally spaced from the valve seat aforesaid on the closed end of said valve housing to produce said "vacuum-valve" in open condition; an annular cavity formed coaxially in the interior of the closed end of said valve housing, said other end of said inner valve sleeve being normally spaced from the bottom of said cavity;

8. The servomotor as claimed in claim 7 in which the first-defined fluid passage means aforesaid include structure defining a plurality of vacuum passages through the end wall of said valve housing, the cavity aforesaid in the latter, the annular air-vacuum chamber aforesaid and the ports in the closure plate aforesaid which place the said constant and variable pressure chambers on opposite sides, respectively, of said piston assembly in communication with each other when said "vacuum-valve" is open and said "air-valve" closed to produce equivalent pressures therein; said other fluid passage means including structure defining a plurality of intersecting passages embodied in the intermediate wall aforesaid of the outer valve sleeve, said air-vacuum chamber and ports in said closure plate aforesaid to admit atmospheric pressure into said variable pressure chamber to create said pressure differential across opposite sides of said piston assembly to move the same in said pressure-applying direction when said "vacuum-valve" is closed to isolate said constant and variable pressure chambers and said "air-valve" open to admit said atmospheric pressure continuously present as a source within the tubular extension aforesaid having an outstanding annular flange at its forward end provided with a cylindrical threaded portion adapted to engage the threaded counterbore aforesaid in said outer valve sleeve to produce a coaxial unitary assembly thereof; and an air chamber adjacent said "air-valve" in continuous communication therewith and said source of atmospheric pressure.

9. The servomotor as claimed in claim 7 in which said annular valve seats on the closed end of said valve housing and the intermediate wall aforesaid of said outer valve sleeve, respectively, each comprises structure defining : an annular groove fitted with a complemental resilient element, and their respective cooperative annular valve faces carried by the inner valve sleeve aforesaid are devoid of resiliency.

10. The servomotor as claimed in claim 7 in which said valve spring in said spring chamber comprises structure defining : a pair of Belleville (dished) spring washers in face-to-face relationship and normally under a predetermined tension.

11. The servomotor as claimed in claim 7 in which said valve spring in said spring chamber comprises structure defining : a conical-type helical spring normally under a predetermined tension.

12. The servomotor as claimed in claim 7 in which said multi-lever force and reaction-transmitting mechanism comprises structure defining ; an annular cup-shaped reaction member having a bottom wall formed with a central hole and a peripheral flange normal thereto; an annular shoulder defining the periphery of said thrust-applying surface on the end wall of said valve housing, and adapted to project through the last-defined hole to slidably support said reaction member thereon ; four equally-spaced cutouts in said last-defined flange with a like-plurality of pressure flanges projecting into said cutouts, respectively, from the periphery of said annular bottom wallnormal to the last-defined peripheral flange ;a pressure-distributing member formed as a rectangular fulcrum plate defining a pair of spaced fulcrum edges, and provided with a pair of parallelly spaced flanges having terminal fulcrum edges, respectively, said fulcrum plate being coaxially seated on said output element to move as a unit therewith and axially spaced from the thrust-applying surface on the valve housing end wall; two pairs of radially disposed levers normally perpendicular to the axis of said output element with the inner end portions of one pair offset from the corresponding straight portions of the other pair of levers and provided with arcuate cutouts, respectively, adapted to straddle-mount substantially half of the diameter of the aforesaid output element; a centrally apertured thrust element movably carried by said output elements; fulcrum plate, inner end portions of said levers, said thrust element and said thrust-applying surface being arranged in series in that order in surface engagement to releasably stabilize said levers in said non-reaction transmitting position normal to the exis of said output element due to lever-action being negated by such surface engagement of said levers, initial movement of said pedal-operated input element from normal position being effective to move said reaction mechanism with its levers in said normal position and said output element as a unit to effect slack take-up until the output element encounters a resistance of sufficient magnitude to arrest such unitary movement, said levers requiring movement concurrently with or prior to operative energization of the servomotor, to an angulated (tilted) position with respect to the axis aforesaid under the pedal-operated input element to convert such surface engagement of said levers into pressure line-contacts (fulcrums) for the lever inner extremes and intermediate points thereon enabling lever-action for transmission of proportional reaction from said output element to said input element during servo-assist; whereupon, additional manual force exerted on said input element is effective to move said reaction member and outer extremes of said levers relatively thereto to dispose the latter in said angulated disposition with respect to the axis aforesaid accompanied by additional spatial separation of said fulcrum plate and said thrust-applying surface on the exterior of the end wall of said valve housing causing the surface engagement aforesaid of said levers to be interrupted and simultaneous conversion of said fulcrum edges into line-contacts with intermediate points on said levers, and the inner extremes of each pair of levers in line-contact with said thrust element and surface, respectively, aforesaid, and thereby producing operative mechanical connections for three radially spaced points on each of said levers to rock to impart lever-action; a mechanical connection between said reaction member and said outer valve sleeve enabling unitary movement thereof; and a normally compressed spring continuously reacting between the end wall of the cup-shaped metallic shell of greater depth and said levers to bias them, said reaction member into contact with the closed end of said valve housing and connected outer valve sleeve toward "unapplied" position of said control valve device corresponding to "power-off" disposition of said piston assembly.

13. The servomotor as claimed in claim 12 in which an annular shoulder is provided on said output element by diminishing the normal diameter thereof for the distributing member plate to seat against, and projecting from said last-defined shoulder is a reduced integral extension which projects through a central hole in said distributing member plate, arcuate cutouts provided in the inner end portions of said reaction levers, coaxial holes through said annular thrust elements, respectively, and through the central opening aforesaid in the end wall of said valve housing, to slidably support the inner valve sleeve aforesaid.

14. The servomotor as claimed in claim 13 in which said mechanical connecting means comprises structure defining an elongated truncated thrust member defined by a hollow conical wall closed at one end and open at the other and adapted to project into said tubular extension with said last-defined closed end predeterminately spaced normally from the end of the reduced extension aforesaid on said output element to accommodate actuation of said control valve device toward "applied" position, and engageable with the end of said reduced extension to actuate said output element directly in the event of power-runout or malfunction otherwise of said servo-motor, the open end of said truncated member being defined by an annular outstanding flange adapted to abut the confronting rear end of said tubular extension whereby the latter and said truncated member are actuatable as a unit to control said control valve device toward "applied" and "unapplied" positions under the pedal-operated input element operably projecting into the hollow of said truncated member in engagement with the closed end thereof; and a port through the wall of said truncated member for maintaining communication between said source of atmospheric pressure and the interior of said tubular extension.

15. The servomotor as claimed in claim 12 including a mechanical connection between said reaction member and the outer valve sleeve aforesaid comprising structure defining: a plurality of thrust pins operably projecting through the coaxial openings aforesaid in the closed ends of said seal chambers in the end wall of said valve housing and sealing elements in said cylindrical chambers aforesaid to engage the bottom wall of said movable reaction member to enable unitary movement of the latter and said last-defined valve sleeve.

16. The servomotor as claimed in claim 15 in which said thrust pins are shortened to introduce a predetermined lost-motion movement between said outer valve sleeve and said movable reaction member whereby the latter portion of movement of the latter valve sleeve is effective to move said reaction member as a unit, to place said reaction levers in said angulated (tilted) position effective to transmit reaction from said output element to said manual input element upon activation of said control valve device to "applied" position to operatively energize said servomotor.

17. The servomotor as claimed in claim 14 in which the aforesaid means for sealing and slidably supporting said tubular extension comprise structure defining: an elongated flexible tubular member having a pair of parallel overlapping cylindrical walls connected at one end to induce relative rolling-action therebetween and an open end defining a pair of annular beads, respectively, said tubular extension operably projects through said inner wall in contact therewith, an annular channel formed by a lip-flange defining the opening in said metallic shell of lesser depth, and an annular groove formed in the exterior surface of said tubular extension and adapted to receive said annular beads, respectively, under tension in airtight sealed relationship whereby the inner wall elongates according to movement of said tubular extension in an applying-direction of said control valve device, and the outer wall correspondingly shortens during such relative movement of the inner wall, the latter being in sealing engagement with the opening aforesaid in said metallic shell of lesser depth and at the same time accommodating sliding movement relative thereto thus enabling exclusion of foreign matter from the working parts of the servomotor and isolation of the variable pressure chamber in the matter from atmospheric pressure.

18. The servomotor as claimed in claim 17 including structure defining an annular air-filtering element composed of porus material and contained in a complemental embossment defining the closed rear end of a cylindrical casing adapted to receive the outer wall aforesaid in close adjacency with the forward end thereof in compressive overlying engagement with the outer surface of the annular bead defining the open end of said outer wall, and thereby stabilizing the open end of the latter in said annular channel formed by said lip-flange projecting from the opening of the metallic shell of lesser depth aforesaid, said manual input element being adapted to project through a central hole provided in said embossment into the hollow of said truncated member into engagement with the closed end of the latter to actuate said tubular extension and connected outer valve sleeve toward "applied" position of said control valve device under operator force applied to said pedal adapted to operate said input element.

19. The servomotor as claimed in claim 1 in which the work-load (resistance) aforesaid is produced by pressurization of fluid by a master brake cylinder adapted to actuate a vehicular brake system under a pressure differential effective on said piston assembly and operator force applied via the pedal aforesaid to said input element, jointly acting on said output element operatively connected to a piston slidably disposed in said master cylinder.

20. The servomotor as claimed in claim 12 in which each of the pair of parellelly spaced flanges associated with said distributing member, is provided with a pair of spaced extensions in the same plane therewith for reception of the inner end portions of one pair of diametrically-opposed reaction levers with their inner extremities contiguous to said output element, said last-defined flanges and pairs of extensions being effective in cooperation with the outer end portions of said reaction levers projecting through their respective cutouts aforesaid formed in the peripheral flange of said reaction member aforesaid, to stabilize said reaction levers in operating positions.

21. The servomotor as claimed in claim 12 in which the rectangular plate aforesaid of the distributing member, is provided with an additional pair of parallelly spaced flanges in spaced relation to the first-defined pair of flanges, with the space between each pair of flanges and the spaces between said pairs of flanges being adapted to receive the inner end portions, respectively, of said four reaction levers to stabilize the same in part in operating positions as a function of their inner extremities being contiguous to said output element, and wherein said offset pair of reaction levers is formed straight to lie in the same plane with the other pair of straight levers, the inner end surface portions thereof being contiguous to said rectangular plate and the thrust element engaging said thrust surface, to fully occupy the space normally obtaining between said rectangular plate and said last-defined thrust element, and a lever-retaining clip fast on each of said pressure flanges aforesaid is adapted to overlie the outer extremity of each of said levers to stabilize the same against fortuitous radially outward displacement.

22. The servomotor as claimed in claim 21 in which the pair of reaction levers which projects through the spaces, respectively, between the two pairs of flanges is substantially the same width as the diameter of said output element, and the inner end portions thereof project between spaced overextending end portions of the other pair of reaction levers which is wider than the diameter of said output element, whereby the inner extremities of all four reaction levers cluster around said output element in contiguous relationship thereto.

23. For use as a brake booster, a pressure differential operated servomotor comprising structure defining: a housing having an apertured end wall, a wall movable in said housing from normal position, a low-pressure servo chamber one one side of the movable wall in continuous communication with a source of pressure different from atmosphere, a variable-pressure servo chamber on the other side of said movable wall selectively communicable with said low-pressure servo chamber and a source of high pressure, an output element operably associated with said movable wall, and a manual input element: a cylindrically walled valve housing fast on and concentrically disposed with respect to said movable wall, and provided with a walled closed end and an open end closed by a detachable ported and centrally apertured plate; a follow-up poppet-type control valve device for controlling fluid communication to establish equivalent pressures in said servo chambers corresponding to "unapplied" position of said valve device to inactivate said movable wall, and for controlling fluid communication between said high pressure source and said variable-pressure servo chamber to establish said differential pressure corresponding to "applied" position of said valve device to activate said movable wall, said valve device including an outer valve sleeve having a circularly apertured wall intermediate thereof which projects radially inwardly with an extension thereof projecting through the aperture in said plate and the aperture in the end wall of the servo housing in sealed relationship with respect to the latter aperture, and an inner valve sleeve which slidably projects through the aperture in the intermediate wall of said outer valve sleeve in sealed relationship thereto; an elongated cylindrical extension coaxially projects from the interior of the closed end of said valve housing to slidably support the inner valve sleeve in sealed relationship, the outer valve sleeve being radially spaced from the interior of the cylindrical wall of said valve housing to produce therewith an annular variable-pressure valve chamber; a first annular valve seat carried by the closed end wall of said valve housing; a second annular valve seat formed on one side of the intermediate wall of said outer valve sleeve; spaced first and second outstanding annular flanges defining annular valve faces at opposite ends, respectively, of said inner valve sleeve with one of said flanges detachably mounted thereon; fluid passage means incorporated in said outer valve sleeve and adapted to establish continuous fluid communication between said valve chamber and said second valve seat; another fluid passage means through the closed end wall of said valve housing and normally connecting said servo chambers via the port aforesaid in the closure plate when said first valve seat and face are normally disengaged (unseated), and said second valve seat and face normally engaged (seated) to isolate said high pressure source from said valve chamber; spring means including a normally compressed spring for biasing said valve sleeves relatively to releasably engage (seat) said second valve seat and face and disengage (unseat) said first valve seat and face corresponding to said "unapplied" position of said valve device, said outer valve sleeve being movable under manual force exerted on said input element from "unapplied" position relatively to the inner valve sleeve and to said valve housing to effect engagement (seating) of said first valve seat and face and disengagement (unseating) of said second valve seat and face corresponding to "applied" position of said valve device, such relative movement of said valve sleeves being accommodated by yielding of said spring means accompanied by augmented compressive status thereof, thus raising the pressure in said variable-pressure servo chamber while maintaining the pressure in the low-pressure servo chamber substantially constant, to produce said differential pressure in said servo chambers effective to move said movable wall and output element in a work-performing direction in cooperation with additional manual force exerted on said input element to jointly perform such work; a first normally compressed spring adapted to operably react continuously on said outer valve sleeve in opposition to manual force exerted thereon via said input element; and a pair of normally engaged abutment portions on said outer valve sleeve and said closure plate, respectively, effective when engaged to define the "unapplied" position aforesaid of said valve device.

24. The servomotor as claimed in claim 23 in which said first spring is backed by a portion of said servo housing, and effective via said outer valve sleeve on said movable wall upon engagement of the pair of abutment portions, to bias the latter wall toward normal position in unison with said outer valve sleeve toward "unapplied" position of said valve device.

25. The servomotor as claimed in claim 23 in which said first spring is backed by the closed end wall of said valve housing.

26. The servomotor as claimed in claim 25 plus a second normally compressed spring operably disposed in said low-pressure servo chamber to continuously react between a portion of said servo housing and said movable wall to bias the latter toward normal position.

27. The servomotor as claimed in claim 23 in which said elongated cylindrical extension is a portion of said output element.

28. The servomotor as claimed in claim 23 in which said first and second valve seats comprise structure defining a pair of resilient O-rings detachably carried in annular surface grooves formed in said closed end wall of said valve housing and intermediate wall of said outer valve sleeve, respectively.

29. The servomotor as claimed in claim 23 in which said first and second valve faces comprise structure defining a pair of annular resilient elements detachably carried by the peripheral margins of said annular outstanding flanges, respectively, at opposite ends of said inner valve sleeve.

* * * * *